United States Patent
Furuta et al.

(10) Patent No.: US 10,921,441 B2
(45) Date of Patent: Feb. 16, 2021

(54) SYNTHETIC APERTURE RADAR SIGNAL PROCESSING DEVICE

(71) Applicant: MITSUBISHI ELECTRIC CORPORATION, Tokyo (JP)

(72) Inventors: Tetsuro Furuta, Tokyo (JP); Katsumi Takahashi, Tokyo (JP); Atsuo Ozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 405 days.

(21) Appl. No.: 16/071,760

(22) PCT Filed: Mar. 9, 2016

(86) PCT No.: PCT/JP2016/057290
§ 371 (c)(1),
(2) Date: Jul. 20, 2018

(87) PCT Pub. No.: WO2017/154125
PCT Pub. Date: Sep. 14, 2017

(65) Prior Publication Data
US 2020/0166635 A1    May 28, 2020

(51) Int. Cl.
*G01S 13/90*    (2006.01)
(52) U.S. Cl.
CPC ...... *G01S 13/9094* (2013.01); *G01S 13/9027* (2019.05)
(58) Field of Classification Search
CPC .................. G01S 13/9094; G01S 13/9027
(Continued)

(56) References Cited

U.S. PATENT DOCUMENTS

| | | | | |
|---|---|---|---|---|
| 5,179,383 A | * | 1/1993 | Raney | G01S 13/9011 342/25 D |
| 5,243,349 A | * | 9/1993 | Mims | G01S 13/90 342/25 A |

(Continued)

FOREIGN PATENT DOCUMENTS

| | | | | |
|---|---|---|---|---|
| JP | 2015210125 A | * | 11/2015 | G01S 13/90 |
| WO | WO 2011/018943 A1 | | 2/2011 | |

OTHER PUBLICATIONS

International Search Report for PCT/JP2016/057290 (PCT/ISA/210) dated May 31, 2016.

(Continued)

*Primary Examiner* — Vladimir Magloire
*Assistant Examiner* — Nuzhat Pervin
(74) *Attorney, Agent, or Firm* — Birch, Stewart, Kolasch & Birch, LLP

(57) ABSTRACT

A synthetic aperture radar signal processing device according to the present invention includes, a low-accuracy interpolation processing unit to perform interpolation processing on discrete data obtained from signals received by a synthetic aperture radar, a high-accuracy interpolation processing unit to perform interpolation processing on the discrete data with higher accuracy than the low-accuracy interpolation processing unit, a curvature determination unit to select either the high-accuracy interpolation processing unit or the low-accuracy interpolation processing unit in accordance with a first curvature that is a curvature of the discrete data at a target area for the interpolation processing, and an image reproduction processing unit to reproduce an image by use of a result of the interpolation processing selected by the curvature determination unit, wherein the curvature determination unit selects a point A, a point B, and a point C of discrete data adjacently arranged in a predetermined direction near the target area, and determines the first curvature (Continued)

based on a distance $\Delta f_{1_R}$ between a point externally dividing a line segment connecting the point A and the point B at (AB+BC):BC and the point C (where AB is a distance between the point A and the point B, and BC is a distance between the point B and the point C). Therefore, the amount of computation in calculating curvature from discrete data can be suppressed.

16 Claims, 15 Drawing Sheets

(58) Field of Classification Search
USPC .................................................. 342/25 R
See application file for complete search history.

(56) References Cited

U.S. PATENT DOCUMENTS

| | | | | |
|---|---|---|---|---|
| 5,365,465 | A * | 11/1994 | Larson | H03M 7/24 341/106 |
| 5,623,928 | A * | 4/1997 | Wright | G01S 7/52023 600/447 |
| 8,717,228 | B2 * | 5/2014 | Nishiyama | G01S 13/538 342/93 |
| 9,336,628 | B2 * | 5/2016 | Chuang | G06T 17/30 |
| 9,976,887 | B1 * | 5/2018 | Mudd | G01F 1/684 |
| 10,796,576 | B2 * | 10/2020 | Matsunaga | B60T 8/17 |
| 2006/0176304 | A1 * | 8/2006 | Ji | G06T 15/87 345/426 |
| 2012/0127019 | A1 * | 5/2012 | Nishiyama | G01S 7/2927 342/93 |
| 2012/0143834 | A1 | 6/2012 | Ebiyama et al. | |
| 2012/0206293 | A1 * | 8/2012 | Nguyen | G01S 13/9017 342/25 F |
| 2013/0272615 | A1 * | 10/2013 | Nakamura | G06T 3/4007 382/195 |
| 2014/0022513 | A1 * | 1/2014 | Mizuno | H04N 9/3194 353/31 |
| 2015/0094979 | A1 * | 4/2015 | Tanaka | B23K 31/027 702/151 |
| 2015/0229807 | A1 * | 8/2015 | Metcalfe | H04N 1/393 358/3.03 |
| 2016/0157828 | A1 * | 6/2016 | Sumi | G01N 29/262 702/189 |

OTHER PUBLICATIONS

Ulander et al., "Synthetic-Aperture Radar Processing Using Fast Factorized Back-Projection", IEEE Transactions on Aerospace and Electronic Systems, vol. 39, No. 3, Jul. 2003, pp. 760-776.
"A Numerical Second Derivative from Three Points", https://mathformeremortals.wordpress.com/2013/01/12/a-numerical-second-derivative-from-three-points/ Jan. 12, 2013.
Extended European Search Report issued in corresponding European Application No. 16893457.8 dated Jan. 24, 2019.

* cited by examiner

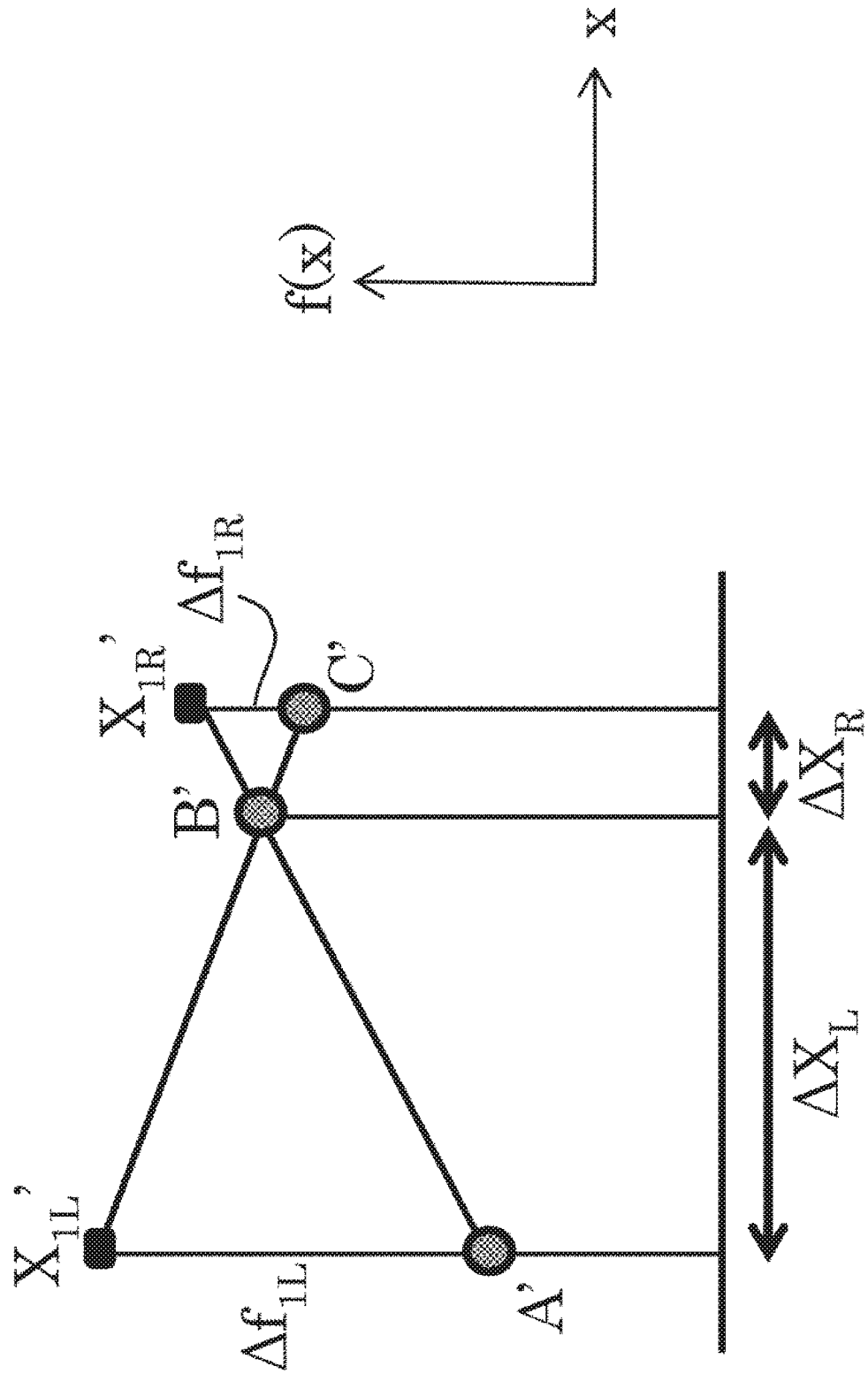

SYNTHETIC APERTURE RADAR SIGNAL PROCESSING DEVICE

TECHNICAL FIELD

The present invention relates to a synthetic aperture radar signal processing device that is installed on a moving platform such as an aircraft and an artificial satellite and reproduces a synthetic aperture radar (SAR: Synthetic Aperture Radar) image with high resolution such as an image of the surface of the ground or the sea.

BACKGROUND ART

A synthetic aperture radar signal processing device installed on a moving platform such as an aircraft and an artificial satellite includes an SAR sensor that has an antenna. While the platform is moving, the SAR sensor repeatedly radiates electromagnetic waves and receives echoes of the electromagnetic waves reflected from a target. The synthetic aperture radar signal processing device obtains a two-dimensional SAR image by performing signal processing on the signals received by the SAR sensor. The processing to obtain a two-dimensional SAR image from the signals received by the SAR sensor is called image reproduction processing, and the method for the image reproduction processing is called an image reproduction algorithm. As an example of the image reproduction algorithm, there is a back projection algorithm disclosed in Non-Patent Document 1 listed below.

The back projection algorithm is a method to obtain the SAR image by calculating distance between the SAR sensor installed on the platform and the target point reflecting the electromagnetic wave, extracting a signal corresponding to the distance, and then integrating the signal.

Non-Patent Document 1 describes a method through which a final SAR image is obtained by signal integration processing using a grid in polar coordinates and by converting the processing result in Cartesian coordinates through two-dimensional interpolation processing, in order to reduce a computation amount of the distance calculation and the integration processing that are described above.

In the two-dimensional interpolation processing, when an interpolation method with a smaller computation amount (e.g. nearest neighbor method or linier method) is used, interpolation accuracy is low. In contrast, when an interpolation method with higher interpolation accuracy (polynomial interpolation) is used, the computation amount increases. In this way, the interpolation accuracy and the computation amount are in a trade-off relationship.

Thus, it can be understood that switching the interpolation processing method between a low accuracy method and a high accuracy method for each of sections in discrete data subjected to the interpolation makes it possible to achieve the processing by which the computation amount can be reduced in the interpolation processing while the interpolation accuracy is maintained. As for the switching method for interpolation or approximation, for example, Patent Document 1 shown next discloses a method.

Patent Document 1 describes a method in which discrete data sequentially produced at every fixed time period is abstracted to reduce and then record the amount of information. The method is a technique in which, instead of storing the whole of the produced discrete data in a storage means such as a RAM or hardware, a group of discrete data points is accurately represented by an approximate expression and coefficients of the approximate expression are stored in the storage means to reduce the amount of information.

PRIOR ART DOCUMENTS

Patent Document

Patent Document 1: International Publication No. WO2011/018943

Non-Patent Document

Non-Patent Document 1: L. M. H. Ulander, H. Hellsten, and G. Stenstrom, "Synthetic Aperture Radar Processing Using Fast Factorized Back-Projection", IEEE Transactions on Aerospace and electronic Systems, vol. 39, no. 3, pp. 760-776, 2003.

SUMMARY OF THE INVENTION

Problems to be Solved by the Invention

In Patent Document 1, a method for switching of an approximate expression depending on the magnitude of curvature of the discrete data is described. The method for calculating the curvature described in Patent Document 1, however, requires a large amount of computation, and even if an optimum interpolation method can be selected with respect to both the computation amount and the accuracy in the interpolation processing, the computation amount required in determining the switching of the interpolation will be a bottleneck. Thus, there is a problem in that the effect in the reduction of time by the switching of the interpolation processing method diminishes.

The present invention has been made to overcome the above described problem, and an object thereof is to provide a synthetic aperture radar signal processing device that can reduce computation amount in the calculation of the curvature in the SAR image reproduction processing in which the interpolation processing is switched depending on the curvature of the discrete data.

Means for Solving Problem

A synthetic aperture radar signal processing device according to the present invention includes a low-accuracy interpolation processing unit to perform interpolation processing on discrete data obtained from signals received by a synthetic aperture radar, a high-accuracy interpolation processing unit to perform interpolation processing on the discrete data with higher accuracy than the low-accuracy interpolation processing unit, a curvature determination unit to select either the high-accuracy interpolation processing unit or the low-accuracy interpolation processing unit in accordance with a first curvature that is a curvature of the discrete data at a target area for the interpolation processing, and an image reproduction processing unit to reproduce an image by use of a result of the interpolation processing selected by the curvature determination unit, wherein the curvature determination unit selects a point A, a point B, and a point C of discrete data adjacently arranged in a predetermined direction near the target area, and determines the first curvature based on a distance $\Delta f_{1R}$ between a point externally dividing a line segment connecting the point A and the point B at (AB+BC):BC and the point C (where AB is a distance between the point A and the point B, and BC is a distance between the point B and the point C).

Effects of the Invention

According to the present invention described above, the amount of computation in calculating the curvature from the discrete data can be suppressed.

BRIEF DESCRIPTION OF THE DRAWINGS

FIG. 15 illustrates curvature calculation of a synthetic aperture radar signal processing device according to Embodiment 2 of the present invention.

EMBODIMENTS FOR CARRYING OUT THE INVENTION

The present invention relates to a synthetic aperture radar signal processing device that selects an interpolation processing method on the basis of curvature of discrete data in an interpolation target area in a case where an SAR image is reproduced by interpolation processing on the discrete data obtained from received signals of a synthetic aperture radar, and in particular, the device is characterized by its smaller computation amount in the curvature calculation. Hereinafter, embodiments of the present invention will be described in detail in reference to the attached figures.

Embodiment 1

Figure 1:
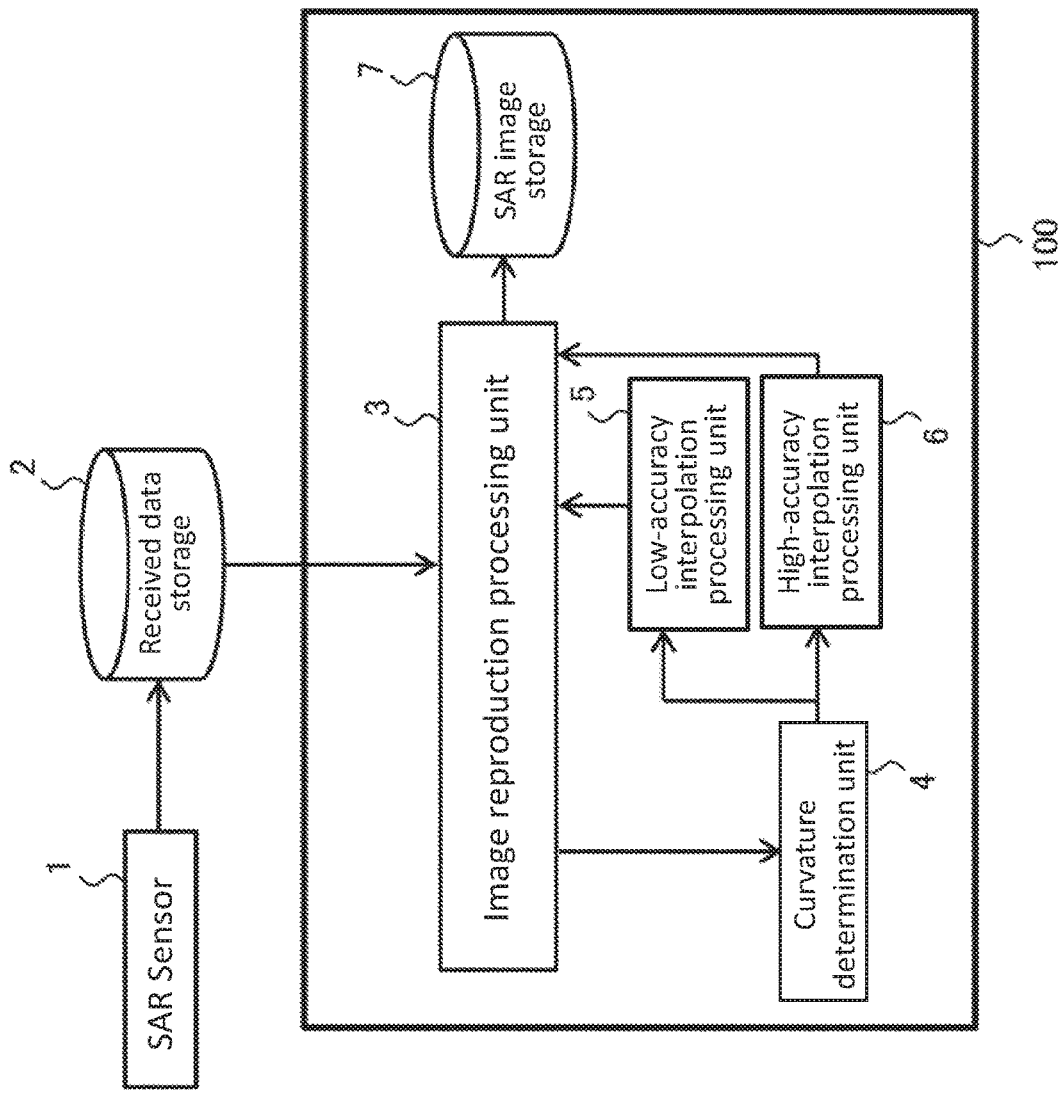
FIG. 1 is a functional block diagram showing an example of a configuration for a synthetic aperture radar signal processing device according to Embodiment 1 of the present invention.

A configuration of the synthetic aperture radar signal processing device 100 according to this embodiment will be described. FIG. 1 is a functional block diagram showing an example of a configuration of a synthetic aperture radar signal processing device 100 according to Embodiment 1 of the present invention. The synthetic aperture radar signal processing device 100 processes received data of an SAR sensor 1 read out from a received data storage 2 to reproduce an SAR image. The synthetic aperture radar signal processing device 100 includes an image reproduction processing unit 3, a curvature determination unit 4, a low-accuracy interpolation processing unit 5, a high-accuracy interpolation processing unit 6, and an SAR image storage 7. In this embodiment, a configuration in which the SAR sensor 1 and the received data storage 2 are provided externally to the synthetic aperture radar signal processing device 100 will be explained. The configuration, however, is not limited thereto, and the synthetic aperture radar signal processing device 100 may internally have the SAR sensor 1 and the received data storage 2. Further, in this embodiment, a configuration in which the synthetic aperture radar signal processing device 100 internally has the SAR image storage 7 will be described, whereas a configuration in which the synthetic aperture radar signal processing device 100 externally has the storage may be possible.

The SAR sensor 1 includes, for example, an antenna, a transmitter, and a receiver (all unshown), and is installed in a moving platform such as an aircraft or an artificial satellite. The SAR sensor 1 radiates high-frequency pulse signals generated by the transmitter from the antenna to space, and with the antenna, the SAR sensor receives echo signals of the high-frequency pulse signals reflected on an observation target. The receiver amplifies the signals received by the antenna, and after converting the frequencies of the received signals amplified to intermediate frequencies, the receiver outputs the received data after digital conversion. Note that the SAR sensor 1 is also referred to as a synthetic aperture radar.

The received data storage 2 is a storage device such as a RAM (Random Access Memory) or a hard disk, and stores the received data obtained by the SAR sensor 1.

The image reproduction processing unit 3 includes a semiconductor integrated circuit in which a CPU (Central Processing Unit) is mounted, a one-chip microcomputer, or the like. The image reproduction processing unit 3 reproduces a SAR image by performing image reproduction processing on the received data stored in the received data storage 2. Because various reflected signals from multiple target points are overlapped in the received data, by imaging through compression processing, the SAR image can be obtained. The image reproduction processing will be detailed later.

The curvature determination unit 4 includes a semiconductor integrated circuit in which a CPU is mounted, a one-chip microcomputer, or the like. The curvature determination unit 4 determines the curvature by use of azimuth-compressed data obtained from the image reproduction processing unit 3 and selects either the low-accuracy interpolation processing unit 5 or the high-accuracy interpolation processing unit 6 on the basis of a determination result of the curvature. The image reproduction processing unit 3 reproduces the SAR image by use of the result of the interpolation processing performed by the interpolation processing unit selected by the curvature determination unit 4. The curvature determination method and the selection method regarding the interpolation processing will be detailed later.

The low-accuracy interpolation processing unit 5 includes a semiconductor integrated circuit in which a CPU is mounted, a one-chip microcomputer, or the like. When the curvature determination unit 4 selects the low-accuracy interpolation processing unit 5, the low-accuracy interpolation processing is performed on the azimuth-compressed data obtained from the image reproduction processing unit 3, and the result of the interpolation processing is sent to the image reproduction processing unit 3.

The high-accuracy interpolation processing unit 6 includes a semiconductor integrated circuit in which a CPU is mounted, a one-chip microcomputer, or the like. When the curvature determination unit 4 selects the high-accuracy interpolation processing unit 6, the high-accuracy interpolation processing is performed on the azimuth-compressed data obtained from the image reproduction processing unit 3, and the result of interpolation processing is sent to the image reproduction processing unit 3.

The SAR image storage 7 is a storage device such as a RAM or a hard disk, and stores the SAR image reproduced by the image reproduction processing unit 3.

In the above description, the components of the synthetic aperture radar signal processing device, namely the image reproduction processing unit 3, the curvature determination unit 4, the low-accuracy interpolation processing unit 5, the high-accuracy interpolation processing unit 6, and the SAR image storage 7 each are assumed to be configured with corresponding dedicated hardware. The components, however, are not limited to the above, and can be configured with a computer.

Figure 2:
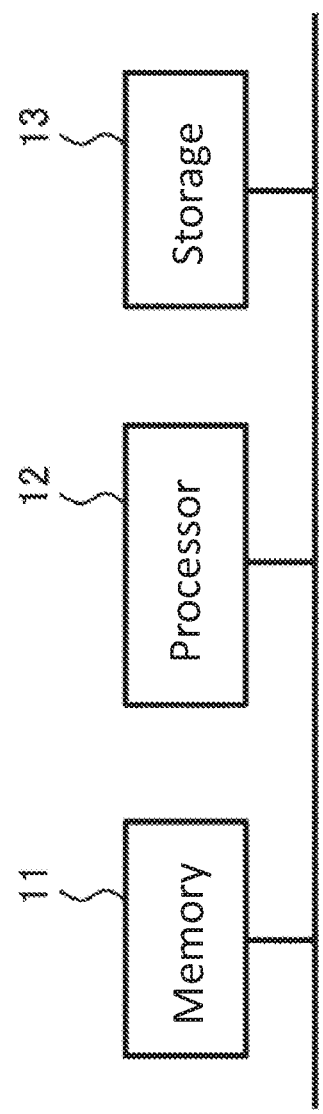
FIG. 2 is a diagram showing an example of a hardware configuration for the synthetic aperture radar signal processing device according to Embodiment 1 of the present invention.

FIG. 2 is a hardware configuration diagram in a case where the synthetic aperture radar signal processing device 100 is configured with a computer. In the case where the synthetic aperture radar signal processing device 100 is configured with a computer, programs of the synthetic aperture radar signal processing in which processing details for the image reproduction processing unit 3, the curvature determination unit 4, the low-accuracy interpolation processing unit 5, and the high-accuracy interpolation processing unit 6 are described are stored in a memory 11 of the computer. A processor 12 such as the CPU of the computer performs each processing by executing the programs of the synthetic aperture radar signal processing stored in the memory 11. The SAR image storage 7 may be configured with a storage 13 such as a hard disk, or may be configured with an external storage where data is readable and writable from the side of the synthetic aperture radar signal processing device 100.

Figure 3:
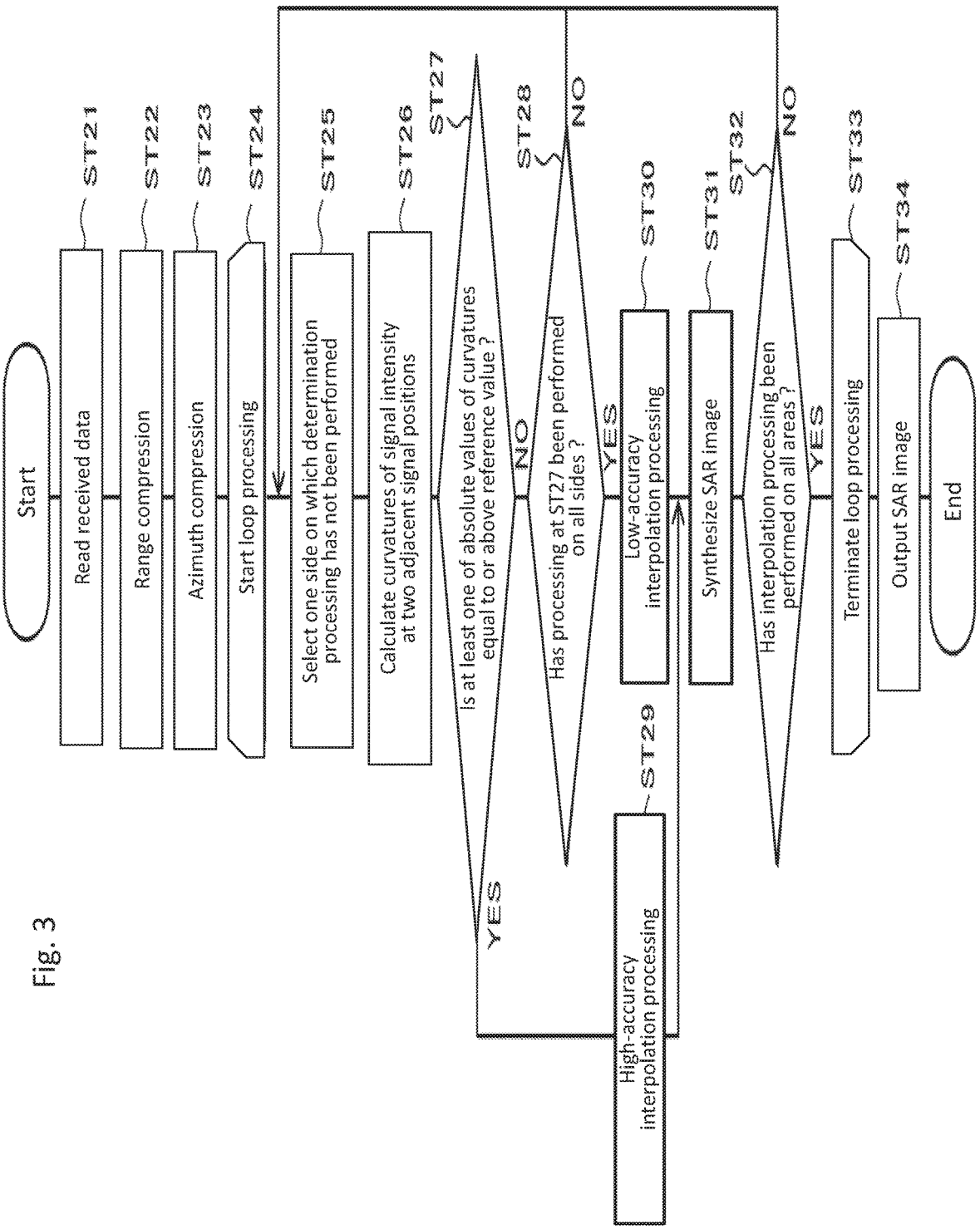
FIG. 3 is a flow chart showing a flow of processing of the synthetic aperture radar signal processing device according to Embodiment 1 of the present invention.

Next, operation will be described. FIG. 3 is a flow chart showing the operation of the synthetic aperture radar signal processing device 100 of the present embodiment, describing sequential processing in generating the SAR image from the data received by the SAR sensor 1.

The SAR sensor 1 radiates the high-frequency pulse signals generated by the transmitter from the antenna to space. When the high-frequency pulse signal radiated from the antenna to space is reflected by the observation target and the echo signal being the reflection of the high-frequency pulse signals returns, the antenna of the SAR sensor 1 receives the echo signal. Further, the receiver of the SAR sensor 1, after amplifying the signals received by the antenna and converting the frequencies of the amplified received signals to the intermediate frequencies, performs A/D conversion on the received signals of the intermediate frequencies to generate digital received data, and outputs it to the received data storage 2.

The image reproduction processing unit 3 reads out the received data from the received data storage 2 as input (step ST21). The image reproduction processing unit 3 performs range compression on the received data in order to increase resolution of the received data in the range direction (step ST22). The range compression processing of the received data is a processing method to increase resolution in the range direction by performing Fourier transformation in the range direction each on the received data and the range reference function and then by multiplying them together. Note that, the traveling direction of the platform on which the SAR sensor 1 is installed is called an azimuth direction and the traveling direction of the radio wave beam emitted from the SAR sensor 1 is called a range direction. Compression processing in the range direction is called the range compression and compression processing in the azimuth direction is called azimuth compression.

Further, in order to increase resolution in the azimuth direction, the image reproduction processing unit 3 performs the azimuth compression on the data processed with the range compression (step ST23). The data after the azimuth compression is complex signals, and the absolute values of the signals represent the SAR image. Although the principle of the azimuth compression processing is the same as that of the range compression, specific processing details of the azimuth compression vary according to an image reproduction algorithm method to be used. There are algorithms such as the range-Doppler algorithm where azimuth compression processing is performed by multiplying data processed with the range compression by azimuth reference function in the frequency domain, the chirp scaling algorithm where imaging is performed only by scaling and Fourier transformation through modulating the chirp rate of a chirp signal in the frequency domain, the $\omega$·k algorithm where, in the data converted into a two-dimensional frequency domain, an angular frequency in the range direction is converted into a wavenumber for the polar coordinate system, and the back-projection type algorithm where the processing is performed in the above-described time domain. These algorithms are publicly known techniques, and thus the description in detail is omitted.

Next, the image reproduction processing unit 3 performs interpolation processing on the azimuth-compressed data to generate the final SAR image in the loop processing from step ST24 to step ST33. Similar to the two-dimensional interpolation processing disclosed in Non-Patent Document 1, the interpolation processing performed by the image reproduction processing unit 3 is intended to perform coordinate transformation.

Figure 4:
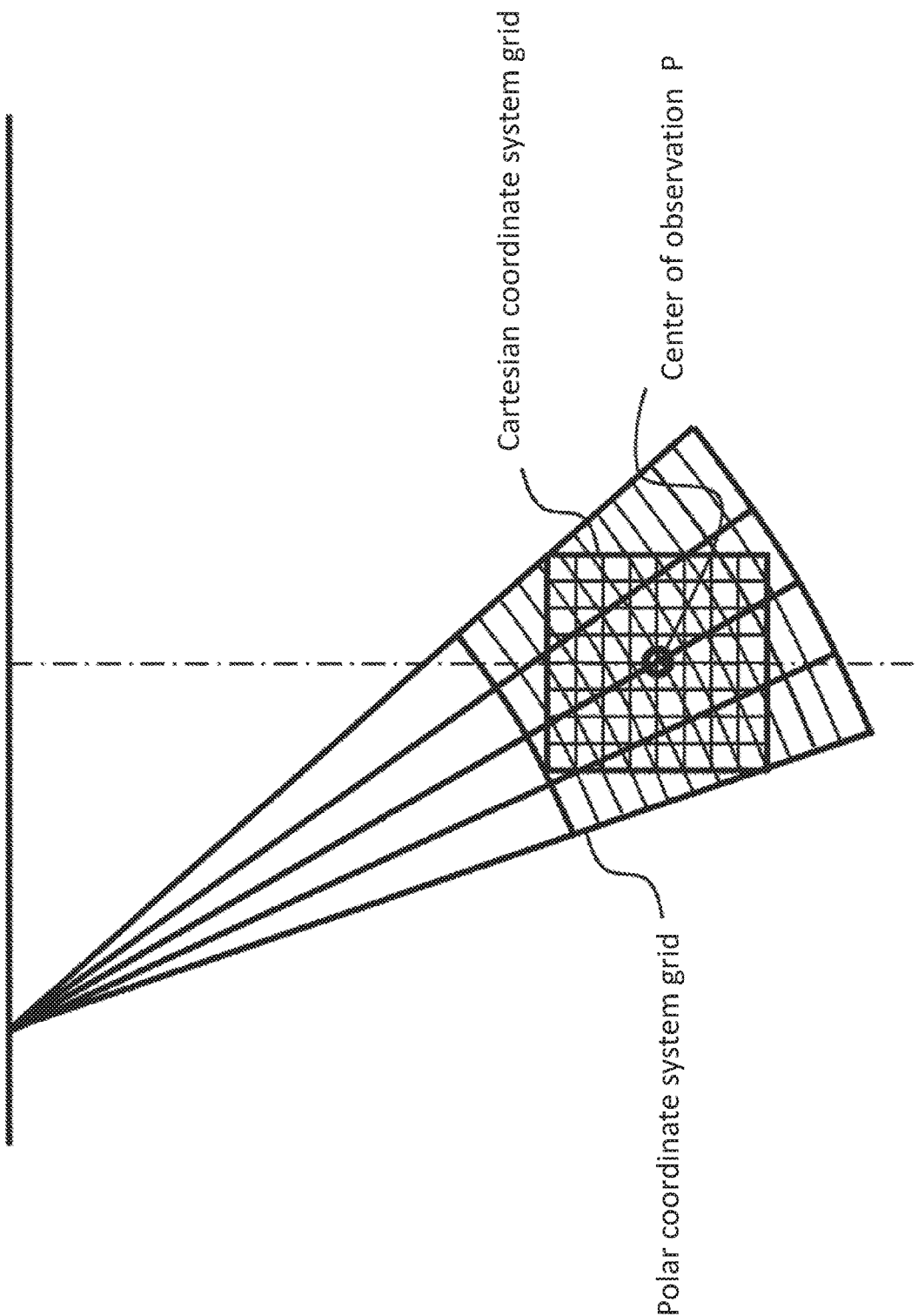
FIG. 4 schematically illustrates a coordinate transformation in two-dimensional interpolation processing.

Coordinate transformation performed by interpolation processing will be described with reference to a figure. FIG. 4 is an explanatory drawing schematically showing coordinate transformation through the two-dimensional interpolation processing.

A back projection algorithm extracts from the received data the signal data corresponding to distance equal to the distance between the SAR sensor 1 installed on the platform and the target point reflecting the electromagnetic waves radiated by the SAR sensor 1, and performs integration processing on the extracted signal at the position of the target point so as to obtain the SAR image.

In contrast, as shown in FIG. 4, in the fast back projection, after the signal integration processing using a grid for a polar coordinate system, the final SAR image can be obtained through the two-dimensional interpolation processing by which the signals are converted from the polar coordinate system to Cartesian coordinate system. By adopting such a method, the amount of computation for the distance calculation and the integration processing can be reduced.

The target unit for the interpolation processing will be described. The target unit for the interpolation processing performed in the loop processing from step ST24 to step ST33 is an area having sides being line segments formed by connecting between data points after azimuth compression. The area is called a target area. The image reproduction processing unit 3 repeatedly executes, for each target area, the processing to generate the final SAR image by using the processing result from either the low-accuracy interpolation processing unit 5 or the high-accuracy interpolation processing unit 6. Therefore, in other words, the loop processing is performed as many times as the number of target areas. Selection for the interpolation processing is made by the curvature determination unit 4. The curvature determination unit 4 determines the curvature of the azimuth-compressed data for each target area and selects the interpolation processing in accordance with the curvature.

Figure 5:
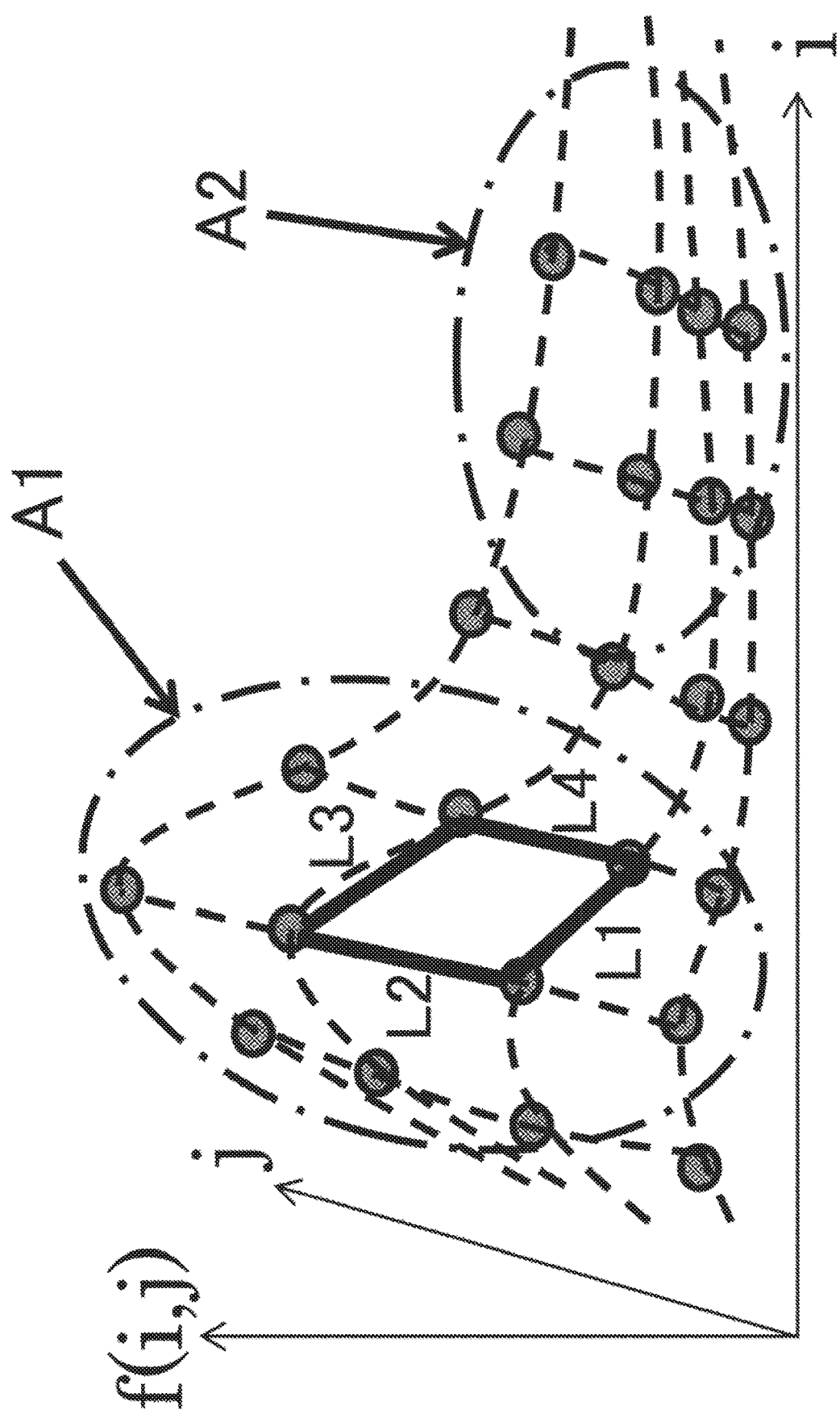
FIG. 5 illustrates a target area for curvature determination and a determination result of the curvature in the synthetic aperture radar signal processing device according to Embodiment 1 of the present invention.

The selection method for the interpolation processing will be described with reference to a figure. FIG. 5 is a diagram showing a target area for the interpolation processing of azimuth-compressed data and classification for the interpolation processing. The azimuth-compressed data is discrete data, which is defined on a plane constituted by the i-axis and the j-axis in the diagram. The f (i, j) axis represents signal intensity of the azimuth-compressed data at a position (i, j). Here, since the i-axis direction and the j-axis direction may be freely selected regardless of a coordinate system, a polar coordinate system, for example, may be used for the representation. As shown with round marks in the figure, the azimuth-compressed data are equidistantly spaced each in the i-axis direction and the j-axis direction. The broken lines connecting points of the azimuth-compressed data, which are points of the discrete data, represent the true values of the azimuth-compressed data.

The target area for the interpolation processing is the area having sides being the line segments L1, L2, L3, and L4, the line segments being formed by connecting neighboring four points in azimuth-compressed data (in the figure, the portion surrounded by the bold solid lines), in other words, a grid-like area that has apexes of four points of the neighboring azimuth-compressed data.

The curvature determination unit 4 determines curvature of the azimuth-compressed data for each target area and selects the interpolation processing in accordance with the curvature. In determining the curvature, firstly the curvature is determined for each of the sides forming the target area, and then the curvature of the target area is determined by considering all the results. In the example shown by the figure, in the area included in the range shown by the dashed and dotted ellipse A1, the curvature is large, and in the area included in the range shown by the dashed and dotted ellipse A2, the curvature is small. In the area with large curvature, the interpolation processing with high accuracy is selected, and in the area with small curvature, the interpolation processing with low accuracy is selected. To be more specific, when the target area is curved in shape, in other words, when change in the signal intensity is large, it is difficult for the low-accuracy interpolation processing such as linear interpolation to precisely express the curved shape. Therefore, the high-accuracy interpolation processing using a polynomial is selected. In contrast, when the target area is flat in shape, in other words, when change in the signal intensity is small, the low-accuracy interpolation processing such as linear interpolation is selected. Therefore, the curvature determination unit 4 selects the high-accuracy interpolation processing unit 6 in an area with large curvature and selects the low-accuracy interpolation processing unit 5 in an area with small curvature.

Now, return to the description of the flowchart. The loop processing from step ST24 to step ST33 is repeatedly performed for each target area. Thus, from among target areas configured with azimuth-compressed data, the image reproduction processing unit 3 selects a target area to which the interpolation processing has not been performed, and notifies the curvature determination unit 4 of the target area.

The curvature determination unit 4 determines the curvature of the azimuth-compressed data in the target area selected by the image reproduction processing unit 3. First, from among the sides forming the target area, the curvature determination unit 4 selects a side on which curvature determination processing has not been performed (step ST25).

Next, the curvature determination unit 4 calculates the curvatures of the signal intensity in the azimuth-compressed data at the two signal positions in both ends of the selected side (step ST26). Let the curvature at one of the two signal positions be a first curvature and the curvature at the other signal position be a second curvature. The curvature calculation method will be described later.

Then, the curvature determination unit 4 compares the absolute values of the first and the second curvatures with a reference value (also called a threshold value) (step ST27). As the result, when at least one of the absolute values of the curvatures is equal to or above the reference value, the curvature determination unit 4 determines that the curvature of the target area is large, and selects the high-accuracy interpolation processing unit 6 (step ST29). Also, when the absolute values of the both curvatures are below the reference value, the curvature determination unit 4 examines whether the determination processing of step ST27 has been performed on all the sides forming the target area (step ST28). When the determination processing has been performed on all the sides, that is, when a side for which the curvature is equal to or above the reference value does not exists, the curvature determination unit 4 determines that the curvature of the target area is small, and selects the low-accuracy interpolation processing unit 5 (step ST30). When a side on which the determination processing of step ST27 has not been performed remains, the process returns to step ST25. From among the sides forming the target area, the curvature determination unit 4 selects the side on which the curvature determination processing has not been performed to continue the processing.

Figure 6:
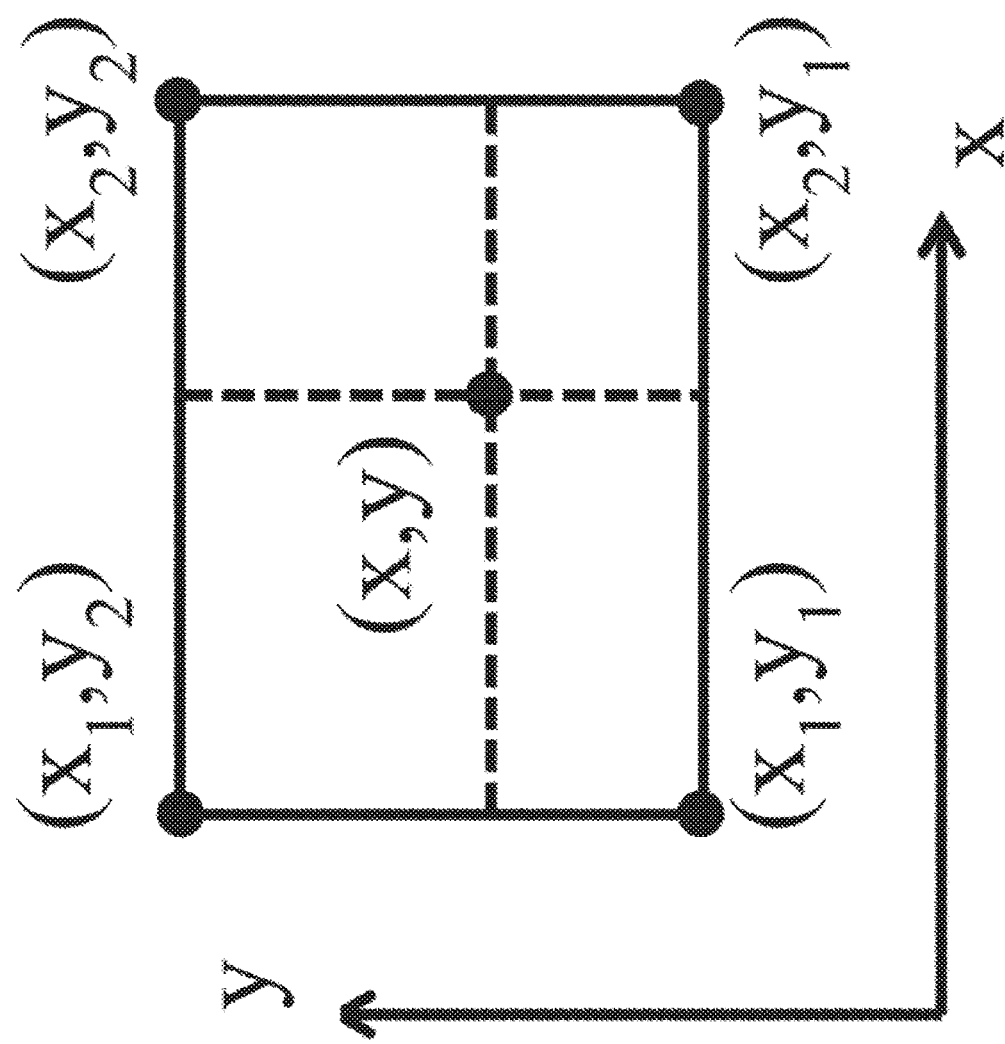
FIG. 6 illustrates an interpolated coordinate point of the two-dimensional interpolation processing in a synthetic aperture radar according to Embodiment 1 of the present invention.

As an example of the low-accuracy interpolation processing performed by the low-accuracy interpolation processing unit 5, the linear interpolation will be described. Now consider a case in which known four points are given and the value z at an internal point (x, y) is to be calculated by the two-dimensional interpolation processing. FIG. 6 is an explanatory diagram showing an interpolated coordinate point of the two-dimensional interpolation processing. Four coordinates: $(x_1, y_1)$, $(x_1, y_2)$, $(x_2, y_1)$, and $(x_2, y_2)$ indicates respective four known points, and (x, y) indicates the coordinates of an internal point. As shown in Expressions (1) to (3), the value of the internal point z (x, y) can be calculated by performing interpolation two times in the x-direction and one time in the y-direction.

[Expression 1]

$$z_1 = \{z(x_2,y_1) - z(x_1,y_1)\}/(x_2-x_1) \times (x-x_1) + z(x_1,y_1) \quad (1)$$

[Expression 2]

$$z_2 = \{z(x_2,y_2) - z(x_1,y_2)\}/(x_2-x_1) \times (x-x_1) + z(x_1,y_2) \quad (2)$$

[Expression 3]

$$z(x,y) = (z_2-z_1)/(y_2-y_1) \times (y-y_1) + z_1 \quad (3)$$

As an example of the high-accuracy interpolation processing performed by the high-accuracy interpolation processing unit 6, cubic spline interpolation will be described. Spline interpolation is a method in which polynomials are created for each section to smoothly connect discrete data points. The expression for the cubic spline interpolation is shown below. Here, the suffix i indicates the i-th section. Since this expression has four unknown coefficients, at least four points of discrete data is needed.

[Expression 4]

$$S_i(x) = a_i x^3 + b_i x^2 + c_i x + d_i \quad (4)$$

Similar to the case in the linear interpolation, calculation for the two-dimensional interpolation can be done by performing interpolation two times in the x-direction and one time in the y-direction.

The image reproduction processing unit 3 generates the final SAR image by using the result of the interpolation processing selected by the curvature determination unit 4 out of the high-accuracy interpolation processing unit 6 or the low-accuracy interpolation processing unit 5 (step ST31). Then, the image reproduction processing unit 3 determines whether the interpolation processing has been performed on all the target areas (step ST32). When the interpolation processing has been completed for all the target areas, the loop processing ends (step ST33), and the final SAR image is outputted to the SAR image storage 7 (step ST34). When a target area to which the interpolation processing has not been performed remains, the process returns to step ST25. The image reproduction processing unit 3 selects the target area to which the interpolation processing has not been performed, and repeats the processing.

Figure 7:
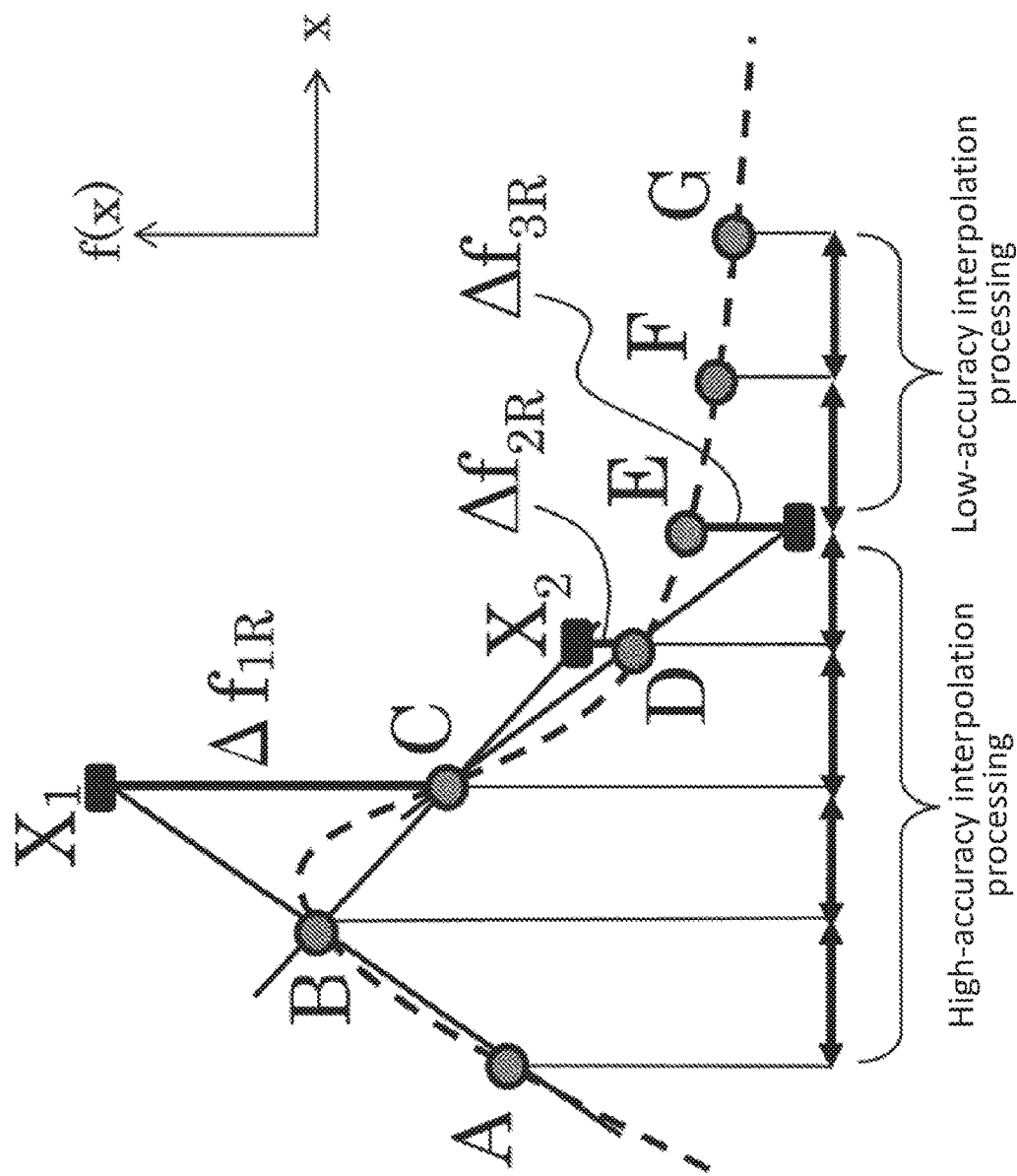
FIG. 7 illustrates a curvature calculation method and a determination result of the interpolation processing for the synthetic aperture radar signal processing device according to Embodiment 1 of the present invention.

Here, details of the curvature determination method will be described with reference to a figure. In FIG. 7, the azimuth-compressed data either in the i-axis direction or in the j-axis direction shown in FIG. 5 are arranged in a one-dimensional direction. For example, in the case where a position in the j-axis direction is selected and the signals obtained by changing positions in the i-axis direction are picked up, the horizontal axis x indicates the i-axis direction and the vertical axis f(x) indicates the signal intensity of the azimuth-compressed data. In addition, in FIG. 7, the positions in the horizontal axis direction of the azimuth-compressed data are assumed to be arranged at equal intervals.

The curvature determination unit 4 calculates the curvature by using four points taken out of the azimuth-compressed data that are adjacently arranged in a predetermined direction near the target area. Here, as shown in the figure, a case will be described in which the curvature of the side connecting data points B and C is determined by using data points A, B, C, and D adjacently arranged near the target area in the i-axis direction. In the following description, the section between the point B and the point C, for example, is referred to as the section BC. Also, a section where the section AB and the section BC are joined is referred to as the section ABC.

First, the curvature determination unit 4 calculates the curvature at the position of the point B. The curvature at the position of the point B can be obtained by calculating the distance $\Delta f_{1R}$ between the point C and the point $X_1$ that externally divides the line segment connecting the point A and the point B at 2:1. In the same way, the curvature determination unit 4 calculates the curvature at the position of the point C. The curvature at the position of the point C can be obtained by calculating the distance $\Delta f_{2R}$ between the point D and the point X2 that externally divides the line segment connecting the point B and the point C at 2:1. These calculations are equivalent to calculation of the second-order differential. The distance $\Delta f_{1R}$ corresponds to the first curvature and the distance $\Delta f_{2R}$ corresponds to the second curvature.

Next, the curvature determination unit 4 compares the calculated distances, $\Delta f_{1R}$ and $\Delta f_{2R}$, with the reference value. Because the distances $\Delta f_{1R}$ and $\Delta f_{2R}$ are in a proportional relation with curvature, when at least one of the distances $\Delta f_{1R}$ and $\Delta f_{2R}$ is equal to or above the reference value, the curvature of the section BC is determined as being large. When the both distances $\Delta f_{1R}$ and $\Delta f_{2R}$ are below the reference value, the curvature determination unit 4 determines the curvature of the section BC as being small. In the example shown in the figure, for the sections AB, BC, CD, and DE having large curvature, the high-accuracy interpolation processing unit 6 is selected, and for the sections EF and FG having small curvature, the low-accuracy interpolation processing unit 5 is selected.

The curvature determination unit 4 performs the above processing for all sides forming target areas. In the case where the target area is the grid-like area indicated with bold lines in FIG. 5, the above processing is performed on the four sides L1, L2, L3, and L4. As the result of the processing, when a large curvature is determined at least in one side, the curvature of the target area is determined as being large. When the curvatures of all the sides are determined as being small, the curvature of the target area is determined as being small.

In the present embodiment, in order to determine the curvature of the section BC, the curvatures at the positions of points B and C (the first curvature and the second curvature) are calculated. The calculation method, however, is not limited to the above. For example, the curvature of the section BC may be determined from the curvature of either point. However, when the determination results differ in the two sections including the section BC, specifically, in the section ABC and the section BCD, because these two sections are on an equality with each other, both of the determination results, not only one of them, must be taken into consideration. Thus, by using the curvatures calculated at the positions of points B and C, the curvature of the section BC can be determined more accurately.

Next, the curvature calculation according to the present embodiment will be compared with the conventional curvature calculation. When signal intensity is expressed as a function f, the signal intensity at the point A is represented by f(A). Then, the expressions for the first and the second curvatures according to the present embodiment are as follows.

[Expression 5]

$$\Delta f_{1R} = -f(A) - f(C) + 2f(B) \quad (5)$$

[Expression 6]

$$\Delta f_{2R} = -f(B) - f(D) + 2f(C) \quad (6)$$

Figure 8:
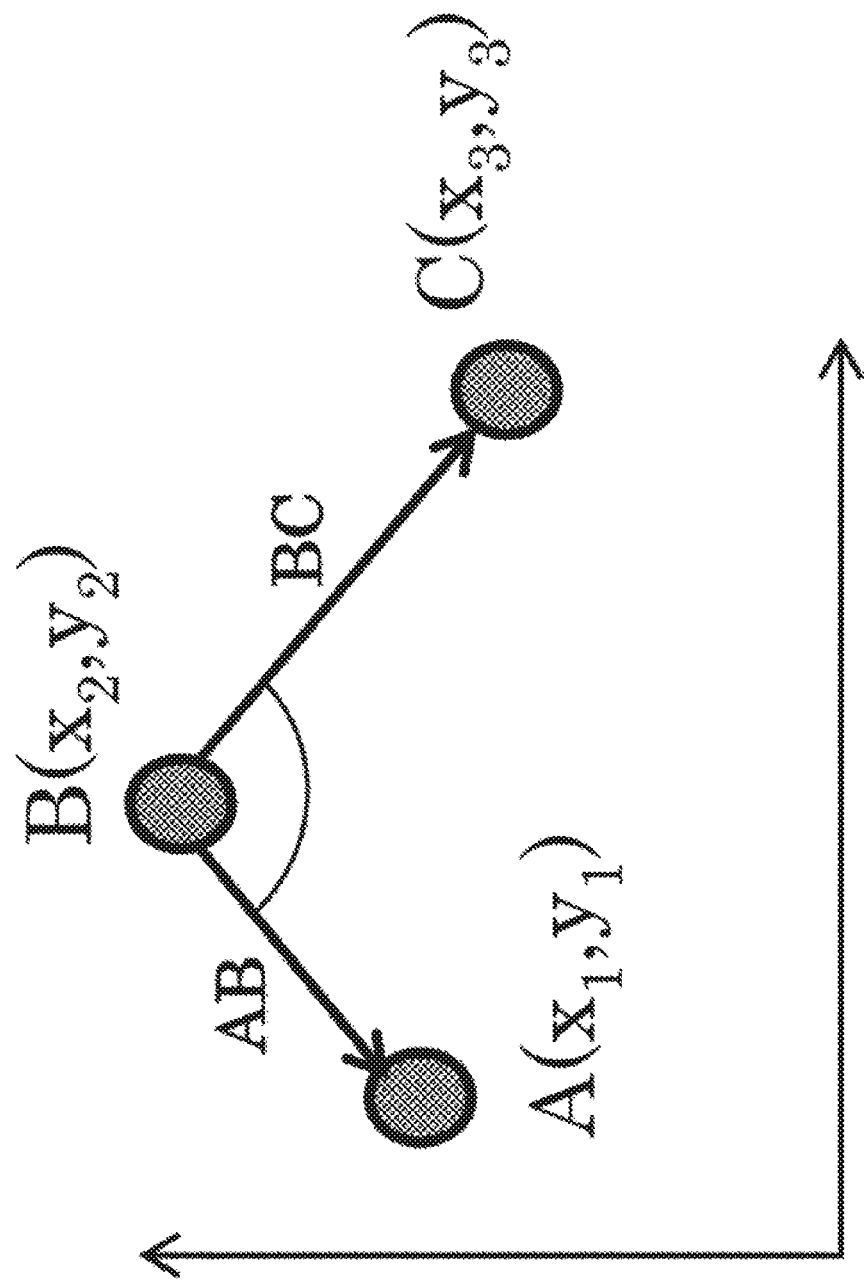
FIG. 8 illustrates a conventional curvature calculation method.

Meanwhile, in a conventional method, in the case of three points (A, B, and C) of the discrete data shown in FIG. 8, the curvature is obtained from normalization calculation and inner product calculation between the vector AB and the vector BC as shown by Expressions (7) to (9).

[Expression 7]

$$AB = (x_1 - x_2, y_1 - y_2) \quad (7)$$

[Expression 8]

$$BC = (x_3 - x_2, y_3 - y_2) \quad (8)$$

[Expression 9]

$$(AB/|AB|) \cdot (BC/|BC|) = \frac{1}{\sqrt{(x_1 - x_2)^2 + (y_1 - y_2)^2}} (x_1 - x_2, y_1 - y_2) \cdot$$

$$\frac{1}{\sqrt{(x_3 - x_2)^2 + (y_3 - y_2)^2}} (x_3 - x_2, y_3 - y_2)$$

$$= \frac{1}{\sqrt{(x_1 - x_2)^2 + (y_1 - y_2)^2}} \frac{1}{\sqrt{(x_3 - x_2)^2 + (y_3 - y_2)^2}} \{(x_1 - x_2)(x_3 - x_2) + (y_1 - y_2)(y_3 - y_2)\}$$

As shown above, because the conventional method uses the division operation and the square root operation that are associated with the vector normalization, the amount of computation increases. In contrast, according to the present invention, the curvature is calculated only using addition and subtraction, so that the amount of computation can be drastically reduced.

Figure 9:
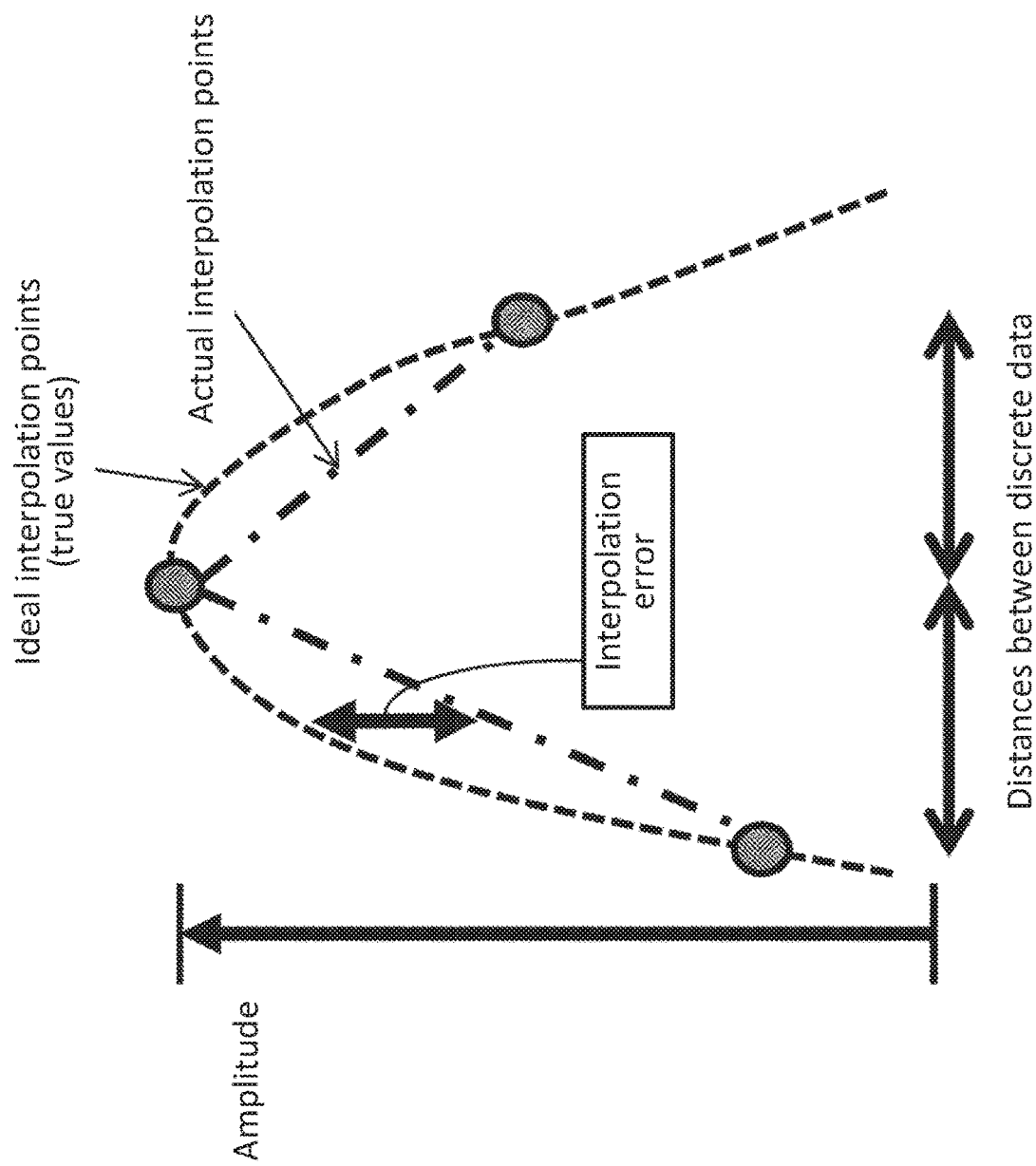
FIG. 9 illustrates an interpolation error accompanied in the interpolation processing of the synthetic aperture radar signal processing device according to Embodiment 1 of the present invention.

Next, how to determine the reference value used for curvature determination will be described with reference to a figure. FIG. 9 is an explanatory diagram showing interpolation error associated with the interpolation processing according to the present embodiment. The broken line represents the ideal interpolation points that agree with the true values and the dashed and dotted line represents the interpolation points obtained by the actual interpolation processing. The amount of deviation between the two lines corresponds to the error (interpolation error) associated with the interpolation processing. By associating this interpolation error with the image resolution, determination of the reference value can be made possible.

Figure 10:
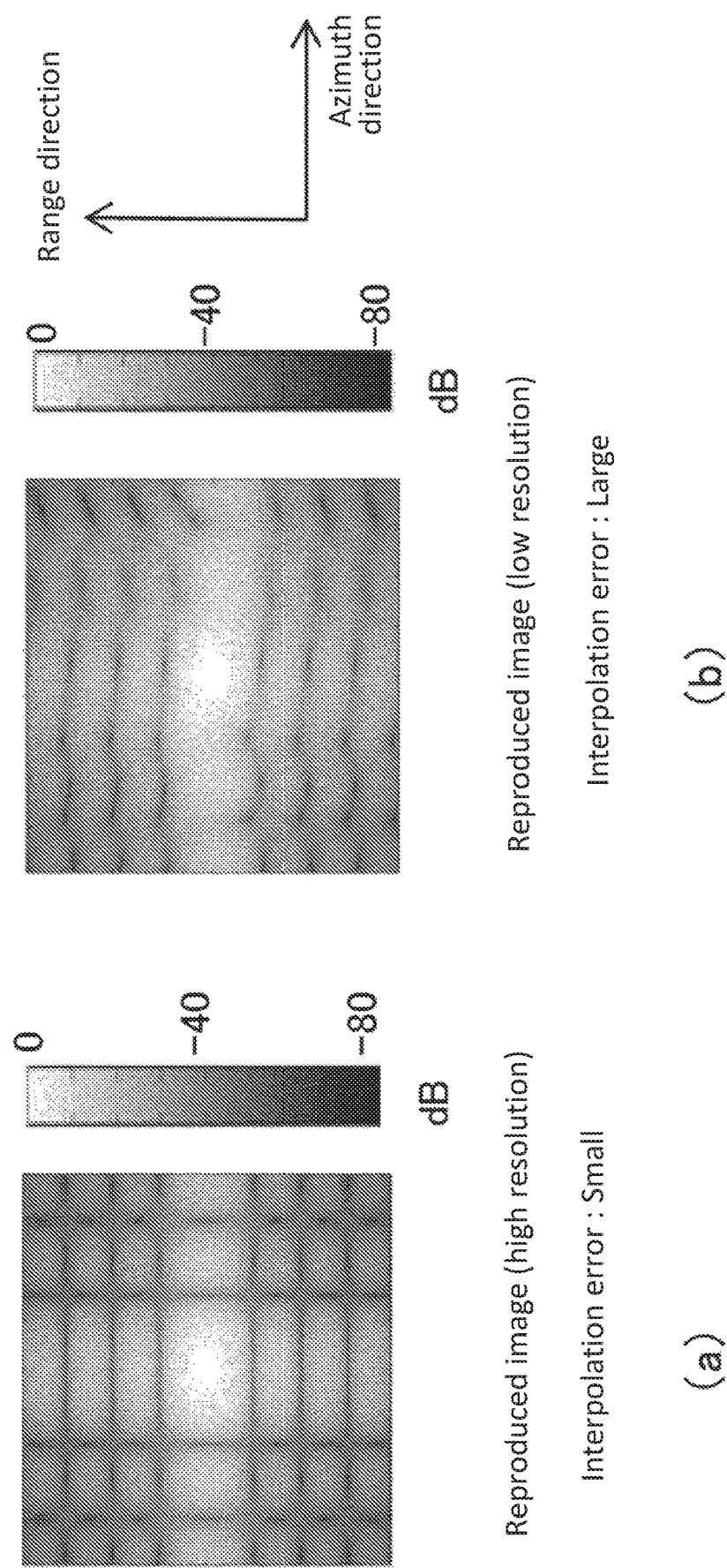
FIG. 10 is images each showing a relationship between an interpolation error and a SAR image in the synthetic aperture radar signal processing device according to Embodiment 1 of the present invention.

FIG. 10 shows SAR images obtained after the image reproduction processing performed using the observation signals received when a point target is irradiated with a radio wave and then observed, and the horizontal axis indicates the range direction and the vertical axis indicates the azimuth direction. FIG. 10 (a) is an SAR image in the case where the interpolation points obtained are all in true values, in other words, no interpolation error is produced. Since distribution of the signal intensity is orthogonal with each other between the azimuth direction and the range direction and is symmetrical in the vertical and horizontal directions when a reference point is taken at the center where the signal intensity is at its peak, it indicates that the SAR image is reproduced with high resolution. In contrast, FIG. 10 (b) is an SAR image in the case where the interpolation processing has low accuracy and the interpolation error is large. Since distribution of the signal intensity is not orthogonal between the azimuth direction and the range direction and is not symmetrical in the vertical and horizontal directions, it indicates that the SAR image being out of focus and having low resolution is reproduced.

Figure 11:
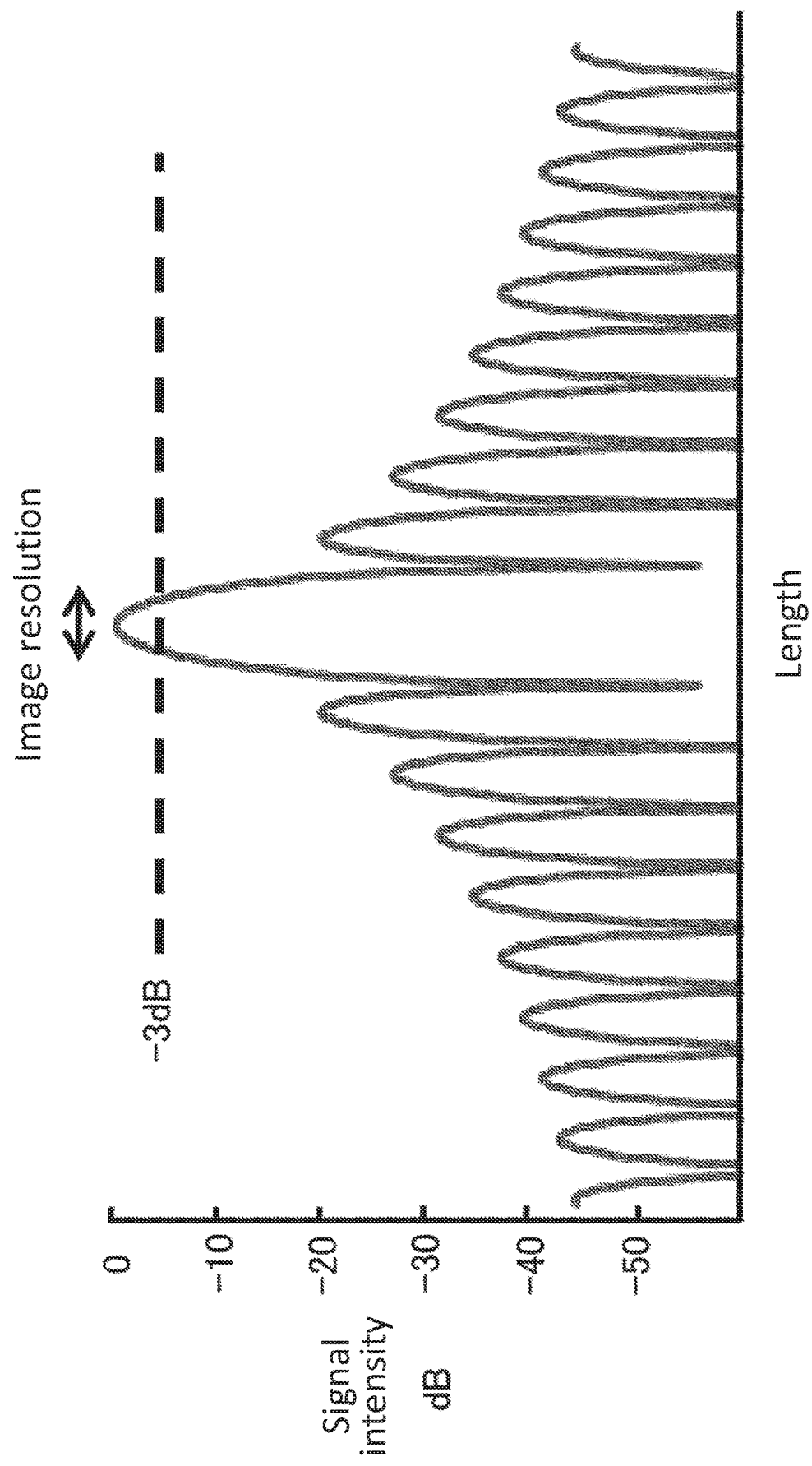
FIG. 11 illustrates image resolution of the SAR image in the synthetic aperture radar signal processing device according to Embodiment 1 of the present invention.

In FIG. 10 (a), with reference to the center of the target, when attention is directed toward distribution of the signal intensity in the range direction or in the azimuth direction, the distribution agrees with a sinc function shown FIG. 11. The sinc function is theoretically derived from a radio wave propagation formula for the received signal. In contrast, in FIG. 10 (b), since the distribution of the signal intensity deviates from the shape based on the sinc function, the SAR image is out of focus.

Although a qualitative view of the SAR image is described above, image resolution is used as one of a quantitative evaluation for the SAR image. Image resolution is an index to indicate fineness in an image, and when its value is smaller, the image is clearer and makes distinction between targets easier.

In general, the image resolution means the full width at half maximum of a signal peak intensity in a signal section, and is defined for each of the range direction and the azimuth direction. When the signal intensity is expressed in decibel, as shown in FIG. 11, the peak value corresponds to 0 dB and half of the intensity corresponds to −3 dB. Thus, the image resolution is also referred to as a 3 dB width. The theoretical value $\delta_{sr}$ of the image resolution in the slant range direction and the theoretical value $\delta_{az}$ of the image resolution in the azimuth direction are determined by the flowing expressions (10) and (11).

[Expression 10]

$$\delta_{sr} = \frac{C}{2B} \quad (10)$$

[Expression 11]

$$\delta_{az} = \frac{\lambda}{2\Delta\theta_{SA}} \quad (11)$$

Figure 12:
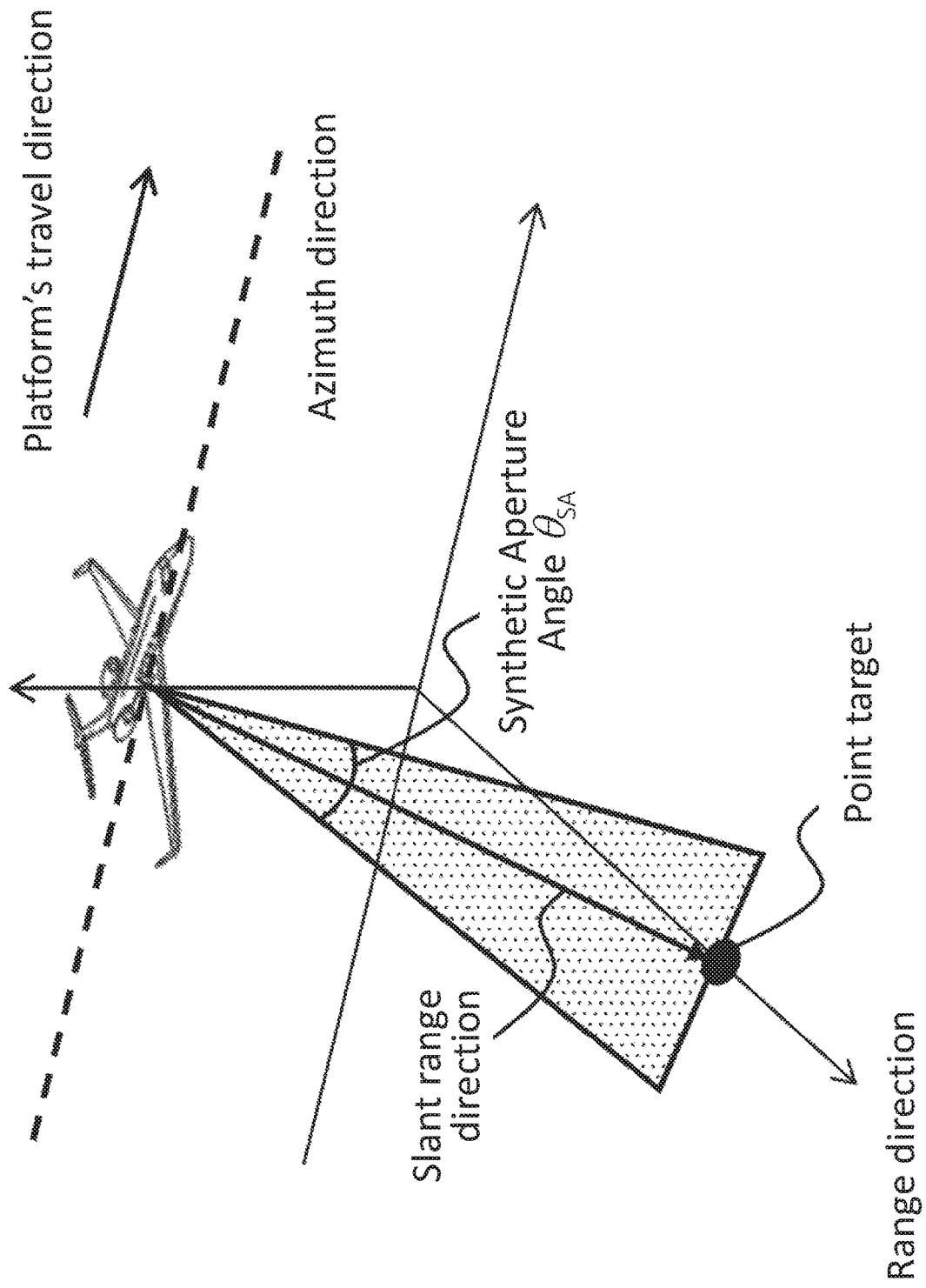
FIG. 12 illustrates observation geometry for the synthetic aperture radar according to Embodiment 1 of the present invention.

Here, C is the speed of light, B is a transmission bandwidth of the radio wave, λ is a wavelength of the radio wave, and $\theta_{SA}$ is a synthetic aperture angle. The synthetic aperture angle means an angle formed by the platform with respect to the fixed point from the time at which irradiation of the radio wave beam to the fixed point is started until the irradiation to the fixed point is finished. A geometry for the SAR observation is shown in FIG. 12. In the SAR observation, as shown in the figure, the radio wave beam radiates obliquely and downwardly with respect to the traveling direction of the platform. Here, the azimuth direction is the traveling direction of the platform and the slant range direction is the direction in which the radio wave beam radiates from the platform. In the figure, an SAR observation in which an angle of the radio wave beam is fixed is shown, and in this case, the angle of the radio wave beam is equal to the synthetic aperture angle.

FIG. 10 includes SAR images which are produced when a point target is irradiated with the radio wave. When the reflection from a numerous number of targets is observed and the image reproduction processing is performed thereto, an SAR image representing terrain and vegetation distributions, which is often seen in a typical aerial photograph, can be obtained.

It is known that when the resolution of the SAR image agrees with the theoretical value of resolution described above, the reproduction image is ideal.

Thus a reference value, which is a threshold value for the curvature determination, can be determined by bringing the resolution of the SAR image into correspondence with the interpolation error. In other words, by examining the relationship between the resolution and the interpolation error in advance, the interpolation error corresponding to the resolution required is set as the reference value. For example, an interpolation error corresponding to the range within several percentage of the theoretical value of resolution may be defined as the reference value.

Because the correspondence between the resolution and the interpolation error of the SAR image is different between the range direction and the azimuth direction, the correspondence can be determined individually in the range direction and in the azimuth direction. Here, details will be described on the correspondence between the resolution and the interpolation error of the SAR image, using an example of the range direction. First, simulation signal data before the SAR image reproduction processing is expressed by a continuous function. As the function expression, for example, a received signal waveform expressed by Expression (12) is used. In this signal waveform, the amplitude is one, and the argument of the exponential ("exp") function corresponds to a phase.

[Expression 12]

$$S_R(\tau) = \exp\left[j2\pi\left\{-f_0\tau_d + \frac{K_r}{2}(\tau-\tau_d)^2\right\}\right] \quad (12)$$

Here, $\tau$ is a range time; $S_R(\tau)$ is a brightness value of signal data at the range time $\tau$; $f_0$ is a center frequency of transmitted chirp pulses; $\tau_d$ is a radio wave's round-trip time to a point target; and $K_r$ is a chirp rate of transmitted chirp pulses.

Figure 13:
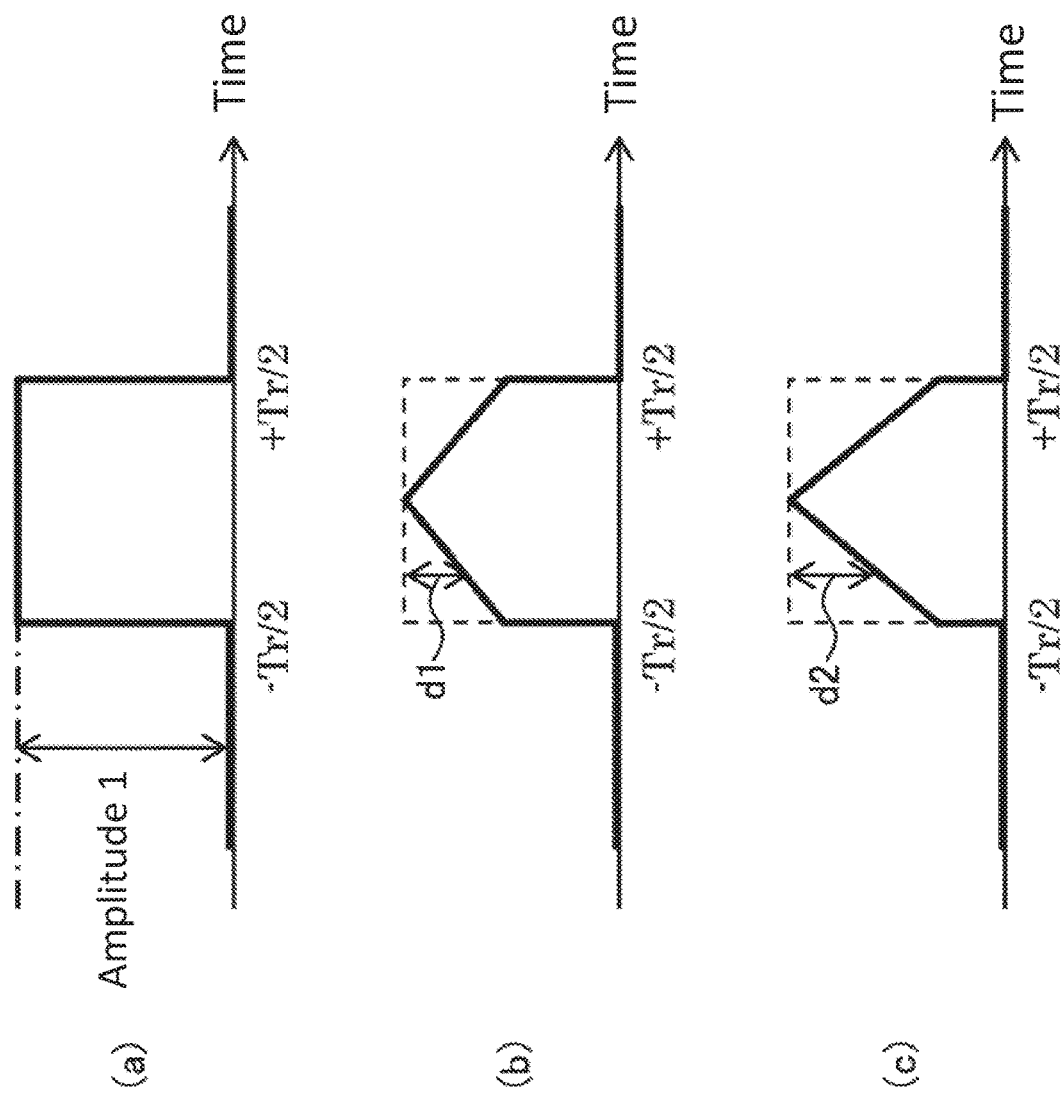
FIG. 13 illustrates simulated signal data of the synthetic aperture radar according to Embodiment 1 of the present invention.

It is assumed that the sampling points on the function expressed by Expression (12) are a result obtained from ideal interpolation processing. Next, with respect to the ideal interpolation result, an operation to decrease amplitude values is performed. The amount of decrease in the amplitude values is changed over time. FIG. 13 includes diagrams showing signal waveforms of the simulation signal data. FIG. 13 (a) shows a signal waveform assumed to be an ideal interpolation result. FIG. 13 (b) and FIG. 13 (c) show signal waveforms of the results of interpolation in which the amplitude values are decreased. In FIG. 13 (b), the amplitude values are decreased by d1 on average. In FIG. 13 (c), the amplitude values are decreased by d2(d2>d1) on average. Tr indicates a width of a transmitted chirp pulse.

The larger the amount of decrease in the amplitude value is, the more the resolution measured after the SAR image reproduction processing is lowered. In other words, the resolution deviates much from the theoretical value. Therefore, by determining the relationship between the manipulated amount of the amplitude value and the error from the theoretical value of the resolution, the relationship between the amount of deviation in the pixel value of the SAR image from the true value and the error from the theoretical value of the resolution in the SAR image can be obtained. In the above, the correspondence with the range direction is described. Similarly, for the azimuth direction, the correspondence between the azimuth resolution and the interpolation error can be obtained using a received signal waveform in the azimuth direction and the synthetic aperture time. To be more specific, it is different in that the received signal waveform in the azimuth direction for the synthetic aperture time is used, instead of using the received signal waveform in the range direction for the transmitted chirp pulse width Tr.

Figure 14:
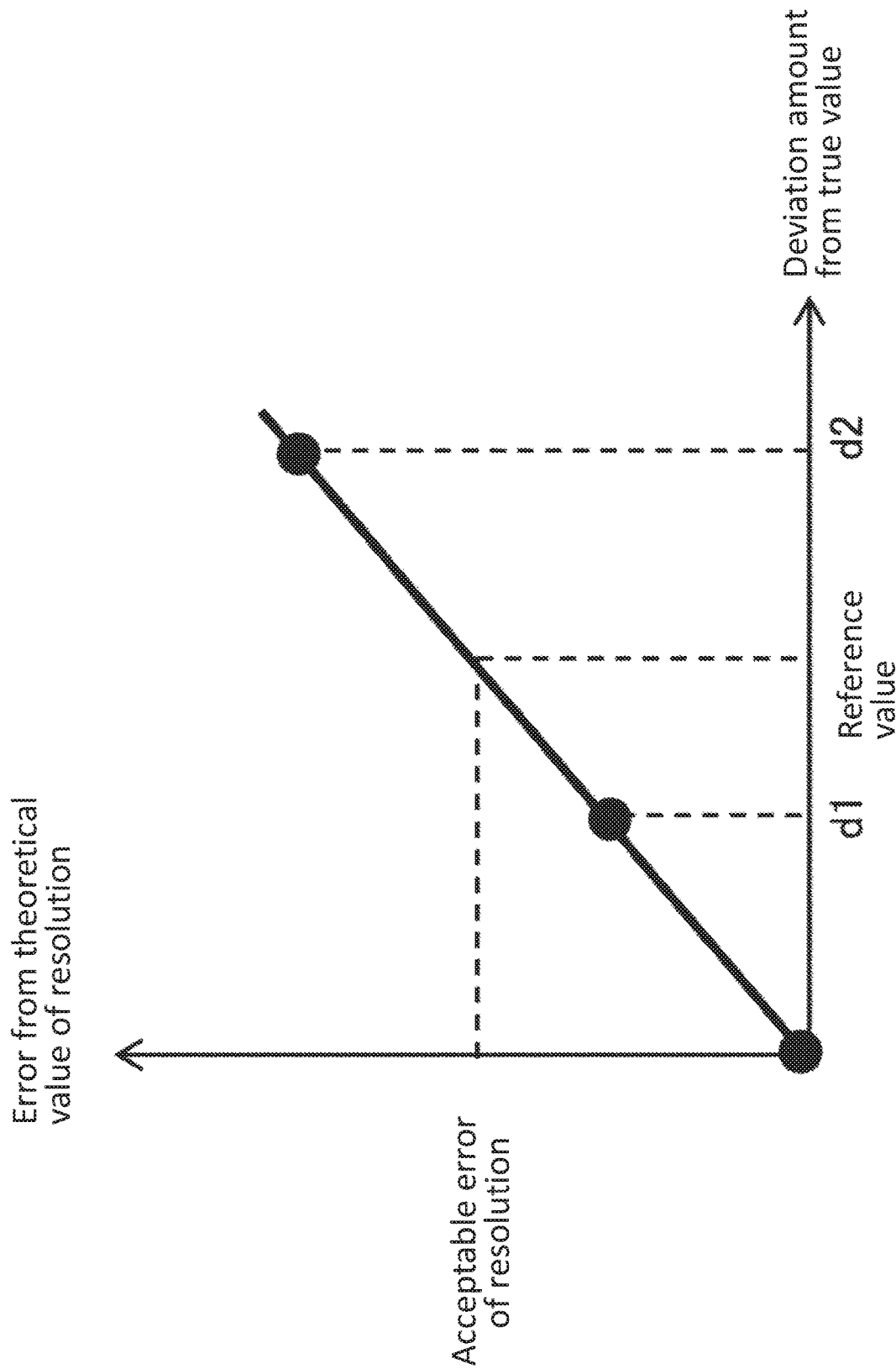
FIG. 14 illustrates a relationship between the resolution of the SAR image and the interpolation error in the synthetic aperture radar according to Embodiment 1 of the present invention.

FIG. 14 is a diagram which is a plot of the resolution obtained from the results of image reproduction processing performed on the three signal waveforms shown in FIG. 13 and shows the relationship between the resolution of the SAR image and the interpolation error. The horizontal axis corresponds to the amount of decrease in the amplitude value from the result of the ideal interpolation processing, namely, the amount of deviation from the true value. The vertical axis represents the error from the theoretical value of the resolution. From this relationship, an acceptable error from the theoretical value of the resolution in the image reproduction is determined freely and the amount of deviation from the true value corresponding to the error is set as a reference value in the curvature determination.

As clarified above, the synthetic aperture radar signal processing device 100 according to Embodiment 1 includes the low-accuracy interpolation processing unit to perform interpolation processing on discrete data obtained from signals received by the synthetic aperture radar, the high-accuracy interpolation processing unit to perform interpolation processing on the discrete data with higher accuracy than the low-accuracy interpolation processing unit, the curvature determination unit to select either the high-accuracy interpolation processing unit or the low-accuracy interpolation processing unit in accordance with the first curvature that is a curvature of the discrete data at a target area for the interpolation processing, and the image reproduction processing unit to reproduce an image by use of a result of the interpolation processing selected by the curvature determination unit, wherein the curvature determination unit selects the point A, the point B, and the point C of the discrete data adjacently arranged in a predetermined direction near the target area, and determines the first curvature based on the distance $\Delta f_{1R}$ between the point externally dividing the line segment connecting the point A and the point B at 2:1 and the point C. As described above, the curvature of the signal intensity in the azimuth-compressed data being discrete data, can be calculated only by addition and subtraction. Therefore, the amount of computation for the curvature calculation can be reduced.

According to the synthetic aperture radar signal processing device 100 of Embodiment 1, the target area for the processing is the area having the sides being the line segments formed by connecting discrete data points, and the curvature determination unit determines the first curvature for each of the sides by setting discrete data at the both ends of each side as the point B and the point C, and selects either the high-accuracy interpolation processing unit or the low-accuracy interpolation processing unit in accordance with the first curvature determined for each side. As a result, the amount of computation in the determination of the interpolation processing can be suppressed.

Further, when a side with the first curvature whose absolute value is above the threshold value exists, the curvature determination unit selects the high-accuracy interpolation processing (for example, two-dimensional spline interpolation) and otherwise selects the low-accuracy interpolation processing (for example, two-dimensional linear interpolation). Therefore, the high-accuracy interpolation processing is performed for an area with a large curvature and the low-accuracy interpolation processing is performed for an area with a small curvature, so that the amount of computation can be suppressed and the final SAR image with sufficient interpolation accuracy can be obtained.

According to the synthetic aperture radar signal processing device 100 of Embodiment 1, the curvature determination unit further selects discrete data points B, C, and D adjacently arranged in a predetermined direction near the target area, determines a second curvature on the basis of the distance $\Delta f_{2R}$ between the point that externally divides the line segment connecting the point B and the point C at 2:1 and the point D, and selects either the high-accuracy interpolation processing unit or the low-accuracy interpolation processing unit in accordance with the first curvature and the second curvature. As the result, the determination in the interpolation processing can be performed with high accuracy.

Note that, for the high-accuracy interpolation processing and the low-accuracy interpolation processing, interpolation expressions other than the above-described may be used. For example, the expressions may include a polynomial interpolation for the high-accuracy interpolation processing and a nearest neighbor method for the low-accuracy interpolation processing. As long as there is a significant difference in the amount of computation, whatever types of the interpolation processing may be selected.

Further, regarding the curvature determination unit 4, two types of determination options that are the high-accuracy interpolation processing and the low-accuracy interpolation processing are described. Alternatively, the number of determination criteria may be increased so that the interpolation processing can be chosen from among three or more options.

In the present embodiment, a determination method in the two-dimensional interpolation processing is exemplified. Alternatively, determination of one-dimensional or three-dimensional interpolation processing may be performed for the above-described determination method.

Embodiment 2

A synthetic aperture radar signal processing device according to the present embodiment will be described. In Embodiment 1, a case in which the azimuth-compressed data are equidistantly spaced in the vertical or horizontal direction is described. In the present embodiment, it is different from Embodiment 1 in that the azimuth-compressed data are not equidistantly spaced, namely spaced at any distance. In Embodiment 2, description will be focused on the difference.

FIG. 15 is a diagram showing a method of calculating curvature of discrete data that are not equidistantly spaced. The horizontal axis x indicates the position of azimuth-compressed data being discrete data, and the vertical axis f(x) indicates signal intensity of the azimuth-compressed data. Here, the method of calculating the curvature at the position of B' point will be described using the discrete data of points A', B' and C' that are not equidistantly spaced in the x-direction. Here, let the distance between the point A' and the point B' be A'B', the distance between the point B' and the point C' be B'C', the x-direction distance between the point A' and the point B' be $\Delta X_L$, and the x-direction distance between the point B' and the point C' be $\Delta X_R$.

First, similar to Embodiment 1, using the three points A', B', and C', the curvature determination unit 4 calculates the distance $\Delta f_{1R}$ between the point $X_{1R'}$ externally dividing the line segment connecting the point A' and the point B' at (A'B'+B'C'):B'C' and the point C'. Further, the curvature determination unit 4 calculates the distance $\Delta f_{1L}$ between the point $X_{1L'}$ externally dividing the line segment connecting the point B' and the point C' at A'B':(A'B'+B'C') and the point A'. Still further, the curvature determination unit 4 calculates an average of the distance $\Delta f_{1R}$ and the distance $\Delta f_{1L}$, and determines a first curvature that is the curvature at the position of the point B' using the calculated average. Similarly, for the position of the point C', the curvature determination unit 4 calculates an average of the distance $\Delta f_{2R}$ and the distance $\Delta f_{2L}$ and determines a second curvature that is the curvature at the position of the point C' using the calculated average.

The reason why the average of the distance $\Delta f_{1R}$ and the distance $\Delta f_{1L}$ is to be used is described below. When the discrete data is equidistantly spaced, the distance $\Delta f_{1R}$ and the distance $\Delta f_{1L}$ are equal. Therefore, in Embodiment 1, only the distance $\Delta f_{1R}$ is calculated to determine the curvature. In contrast, when the discrete data is not equidistant, the distance $\Delta f_{1R}$ and the distance $\Delta f_{1L}$ varies in accordance with the ratio of A'B':B'C'. For example, when the point B' is closer to the point C' than to the point A' as shown in FIG. 15, the distance $\Delta f_{1R}$ becomes smaller, so that the curvature is underrated in the curvature determination. In the present embodiment, in order to avoid this problem, the average of the distance $\Delta f_{1R}$ and the distance $\Delta f_{1L}$ is calculated and the curvature is determined using the result. The expressions for the first curvature calculation are as follows:

[Expression 13]

$$\Delta f_{1R} = f(A') + (f(B') - f(A')) \times (\Delta X_L + \Delta X_R)/\Delta X_L - f(C') \quad (13)$$

[Expression 14]

$$\Delta f_{1L} = f(C') + (f(B') - f(A')) \times (\Delta X_L + \Delta X_R)/\Delta X_R - f(A') \quad (14)$$

[Expression 15]

$$(\Delta f_{1R} + \Delta f_{1L})/2 = (\Delta X_L + \Delta X_R)/(\Delta X_L \Delta X_L)\{-\Delta X_R f(A') - \Delta X_L f(C') + (\Delta X_L + \Delta X_R) f(B')\}/2 \quad (15)$$

Note that, when the discrete data is equidistantly spaced, as in Embodiment 1, since the distance $\Delta f_{1R}$ and the distance $\Delta f_{1L}$ are equal, the distance $\Delta f_{1L}$ instead of the distance $\Delta f_{1R}$, may be used for the curvature determination. Similarly, since the distance $\Delta f_{2R}$ and the distance $\Delta f_{2L}$ are equal, the distance $\Delta f_{2L}$, instead of the distance $\Delta f_{2R}$, may be used for the curvature determination.

As clarified above, the synthetic aperture radar signal processing device 100 according to Embodiment 2 includes the low-accuracy interpolation processing unit to perform interpolation processing on discrete data obtained from signals received by the synthetic aperture radar, the high-accuracy interpolation processing unit to perform interpolation processing on the discrete data with higher accuracy than the low-accuracy interpolation processing unit, the curvature determination unit to select either the high-accuracy interpolation processing unit or the low-accuracy interpolation processing unit in accordance with the first curvature that is a curvature of the discrete data at a target area for the interpolation processing, and the image reproduction processing unit to reproduce an image by use of a result of the interpolation processing selected by the curvature determination unit, wherein the curvature determination unit selects the point A, the point B, and the point C of the discrete data adjacently arranged in a predetermined direction near the target area, and determines the first curvature based on the distance $\Delta f_{1R}$ between the point externally dividing the line segment connecting the point A and the point B at (AB+BC):BC and the point C. As described above, even when the azimuth-compressed data being discrete data is not equidistant, the curvature of the signal intensity can be obtained with a smaller computation amount in comparison with the conventional method.

Further, according to the synthetic aperture radar signal processing device 100 of Embodiment 2, the curvature determination unit determines the first curvature on the basis of the distance $\Delta f_{1L}$ between the point externally dividing the line segment connecting the point B and the point C at AB:(AB+BC) and the point A, and the distance $\Delta f_{1R}$. Therefore, even when the azimuth-compressed data being discrete data is not equidistant, the determination of the interpolation processing can be performed with high accuracy.

It is noted that, within the scope of the present invention, the embodiments can be freely combined, or any components in the embodiments can be modified or any components in the embodiments can be omitted.

INDUSTRIAL APPLICABILITY

The synthetic aperture radar signal processing device according to the present invention is suitable for an application in which reduction in the amount of computation is highly required while computation accuracy in the image reproduction processing is sufficiently maintained in reproducing a SAR image such as an image of the surface of the ground or the sea.

EXPLANATION OF REFERENCE NUMERALS

1: SAR sensor (synthetic aperture radar)
2: received data storage
3: image reproduction processing unit
4: curvature determination unit
5: low-accuracy interpolation processing unit
6: high-accuracy interpolation processing unit
7: SAR image storage
11: memory
12: processor
13: storage
100: synthetic aperture radar signal processing device

The invention claimed is:

1. A synthetic aperture radar signal processing device, comprising:
   a low-accuracy interpolator to perform interpolation processing on discrete data obtained from signals received by a synthetic aperture radar;
   a high-accuracy interpolator to perform interpolation processing on the discrete data with higher accuracy than the low-accuracy interpolation processing unit;
   a curvature determiner to select either the high-accuracy interpolator or the low-accuracy interpolator in accordance with a first curvature that is a curvature of the discrete data at a target area for the interpolation processing; and
   an image reproduction processor to reproduce an image by use of a result of the interpolation processing selected by the curvature determiner,
   wherein the curvature determiner selects a point A, a point B, and a point C of discrete data adjacently arranged in a predetermined direction near the target area, and determines the first curvature based on a distance $\Delta f_{1R}$ between a point externally dividing a line segment connecting the point A and the point B at (AB+BC):BC and the point C (where AB is a distance between the point A and the point B, and BC is a distance between the point B and the point C).

2. The synthetic aperture radar signal processing device according to claim 1, wherein the curvature determiner determines the first curvature based on a distance $\Delta f_{1L}$ between a point externally dividing a line segment connecting the point B and the point C at AB:(AB+BC) and the point A, and the distance $\Delta f_{1R}$.

3. The synthetic aperture radar signal processing device according to claim 2, wherein the curvature determiner sets an average value of the distance $\Delta_{1L}$ and the distance $\Delta f_{1R}$ as the first curvature.

4. The synthetic aperture radar signal processing device according to claim 1, wherein, when an absolute value of the first curvature is above a threshold value, the curvature determiner selects the high-accuracy interpolator and otherwise selects the low-accuracy interpolator.

5. The synthetic aperture radar signal processing device according to claim 1, wherein the curvature determiner selects the point B, the point C, and a point D of discrete data adjacently arranged in the predetermined direction near the target area, determines a second curvature based on a distance $\Delta f_{2R}$ between a point externally dividing a line segment connecting the point B and the point C at (BC+CD):CD and the point D, and selects either the high-accuracy interpolator or the low-accuracy interpolator in accordance with the first curvature and the second curvature (where CD is a distance between the point C and the point D).

6. The synthetic aperture radar signal processing device according to claim 5, wherein the curvature determiner determines the second curvature based on a distance $\Delta f_{2L}$ between a point externally dividing a line segment connecting the point C and the point D at BC:(BC+CD), and the distance $\Delta f_{2R}$.

7. The synthetic aperture radar signal processing device according to claim 6, wherein the curvature determiner sets an average value of the distance $\Delta f_{2L}$ and the distance $\Delta f_{2R}$ as the second curvature.

8. The synthetic aperture radar signal processing device according to claim 5, wherein, when at least either one of an absolute value of the first curvature and an absolute value of the second curvature is above a threshold value, the curvature determiner selects the high-accuracy interpolator and otherwise selects the low-accuracy interpolator.

9. The synthetic aperture radar signal processing device according to claim 1, wherein the target area is an area having sides being line segments formed by connecting points of the discrete data, and the curvature determiner determines the first curvature for each of the sides by setting the discrete data at the both ends of each side as the point B and the point C, and selects either the high-accuracy interpolator or the low-accuracy interpolator in accordance with the first curvature determined for each of the sides.

10. The synthetic aperture radar signal processing device according to claim 9, wherein, when a side for which an absolute value of the first curvature is above a threshold value exists, the curvature determiner selects the high-accuracy interpolator and otherwise selects the low-accuracy interpolator.

11. The synthetic aperture radar signal processing device according to claim 5, wherein the curvature determiner sets the target area by an area having sides being line segments formed by connecting points of the discrete data, determines the first curvature and the second curvature for each of the sides by setting the discrete data at the both ends of each side as the point B and the point C, and selects either the high-accuracy interpolator or the low-accuracy interpolator in accordance with the first curvature and the second curvature determined for each of the sides.

12. The synthetic aperture radar signal processing device according to claim 11, wherein, when a side for which at least either one of an absolute value of the first curvature and an absolute value of the second curvature is above a threshold value exists, the curvature determiner selects the high-accuracy interpolator and otherwise selects the low-accuracy interpolator.

13. The synthetic aperture radar signal processing device according to claim 4, wherein the threshold value is obtained by determining in advance a relationship between a deviation amount in a pixel value of the image from a true value and an error from a theoretical value of resolution of the image, and then by determining as the threshold value the deviation amount when the error takes a predetermined value.

14. The synthetic aperture radar signal processing device according to claim 8, wherein the threshold value is obtained by determining in advance a relationship between a deviation amount in a pixel value of the image from a true value and an error from a theoretical value of resolution of the image, and then by determining as the threshold value the deviation amount when the error takes a predetermined value.

15. The synthetic aperture radar signal processing device according to claim 10, wherein the threshold value is obtained by determining in advance a relationship between a deviation amount in a pixel value of the image from a true value and an error from a theoretical value of resolution of the image, and then by determining as the threshold value the deviation amount when the error takes a predetermined value.

16. The synthetic aperture radar signal processing device according to claim 12, wherein the threshold value is obtained by determining in advance a relationship between a deviation amount in a pixel value of the image from a true value and an error from a theoretical value of resolution of the image, and then by determining as the threshold value the deviation amount when the error takes a predetermined value.

* * * * *